United States Patent
Matsuo et al.

(10) Patent No.: US 11,260,931 B2
(45) Date of Patent: Mar. 1, 2022

(54) BODY FRAME OF SADDLE RIDING VEHICLE

(71) Applicant: HONDA MOTOR CO., LTD., Tokyo (JP)

(72) Inventors: Tomoya Matsuo, Tokyo (JP); Kyohei Hosoya, Tokyo (JP); Hideaki Kawase, Tokyo (JP); Shinya Morooka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 16/860,762

(22) Filed: Apr. 28, 2020

(65) Prior Publication Data
US 2020/0391819 A1   Dec. 17, 2020

(30) Foreign Application Priority Data
Jun. 14, 2019   (JP) .............................. JP2019-111248

(51) Int. Cl.
*B62K 19/32*   (2006.01)
*B62K 11/04*   (2006.01)

(52) U.S. Cl.
CPC .............. *B62K 19/32* (2013.01); *B62K 11/04* (2013.01)

(58) Field of Classification Search
CPC ......... B62K 19/28; B62K 19/32; B62K 11/04
See application file for complete search history.

(56) References Cited

U.S. PATENT DOCUMENTS

| | | | | |
|---|---|---|---|---|
| 6,481,522 B1 * | 11/2002 | Adachi | ................. | B62K 11/04 180/219 |
| 7,360,619 B2 * | 4/2008 | Adachi | ................. | B62K 11/04 180/219 |
| 7,503,575 B2 * | 3/2009 | Kurokawa | ............. | B62K 11/04 280/279 |
| 7,637,345 B2 * | 12/2009 | Kurokawa | ............. | B62K 11/04 180/311 |
| 7,694,985 B2 * | 4/2010 | Hoshi | .................... | B62K 11/04 280/274 |

(Continued)

FOREIGN PATENT DOCUMENTS

| | | |
|---|---|---|
| EP | 3147190 A1 | 3/2017 |
| EP | 3366560 A1 | 8/2018 |

(Continued)

OTHER PUBLICATIONS

German Office Action dated Sep. 3, 2021, English translation included, 10 pages.
Indian Office Action dated Nov. 9, 2021, 5 pages.

*Primary Examiner* — Tony H Winner
*Assistant Examiner* — Michael R Stabley
(74) *Attorney, Agent, or Firm* — Rankin, Hill & Clark LLP

(57) ABSTRACT

In a body frame, a pair of left and right main frames extend downward to the rear from the upper portion of a head pipe and a down frame extends downward to the rear from the lower portion of the head pipe, a gusset is provided in the body frame, the gusset being joined to the head pipe, and the gusset includes a center wall portion and lower extension portions, the center wall portion being disposed between inner side wall portions of the left and right main frames, the lower extension portions extending downward from the center wall portion and being joined to outer side surfaces of the down frame.

7 Claims, 19 Drawing Sheets

(56) References Cited

U.S. PATENT DOCUMENTS

| | | | | |
|---|---|---|---|---|
| 7,699,132 | B2* | 4/2010 | Adachi | B62K 19/20 |
| | | | | 180/219 |
| 8,272,656 | B2* | 9/2012 | Katsura | B62K 11/04 |
| | | | | 280/279 |
| 8,297,396 | B2* | 10/2012 | Yokoyama | B62K 11/04 |
| | | | | 180/219 |
| 9,272,747 | B2* | 3/2016 | Hirayama | B62K 11/04 |
| 9,327,790 | B2* | 5/2016 | Matsuo | B62K 19/12 |
| 9,802,667 | B2* | 10/2017 | Ishida | B62K 19/20 |
| 2010/0194072 | A1 | 8/2010 | Katsura | |
| 2012/0205179 | A1 | 8/2012 | Toda et al. | |
| 2013/0026733 | A1 | 1/2013 | Oe et al. | |
| 2018/0215437 | A1* | 8/2018 | Kurabayashi | B62K 11/04 |

FOREIGN PATENT DOCUMENTS

| | | |
|---|---|---|
| JP | 5618856 | 11/2014 |
| JP | 5765114 | 8/2015 |
| WO | 2018/179795 A1 | 10/2018 |

* cited by examiner

FIG.10
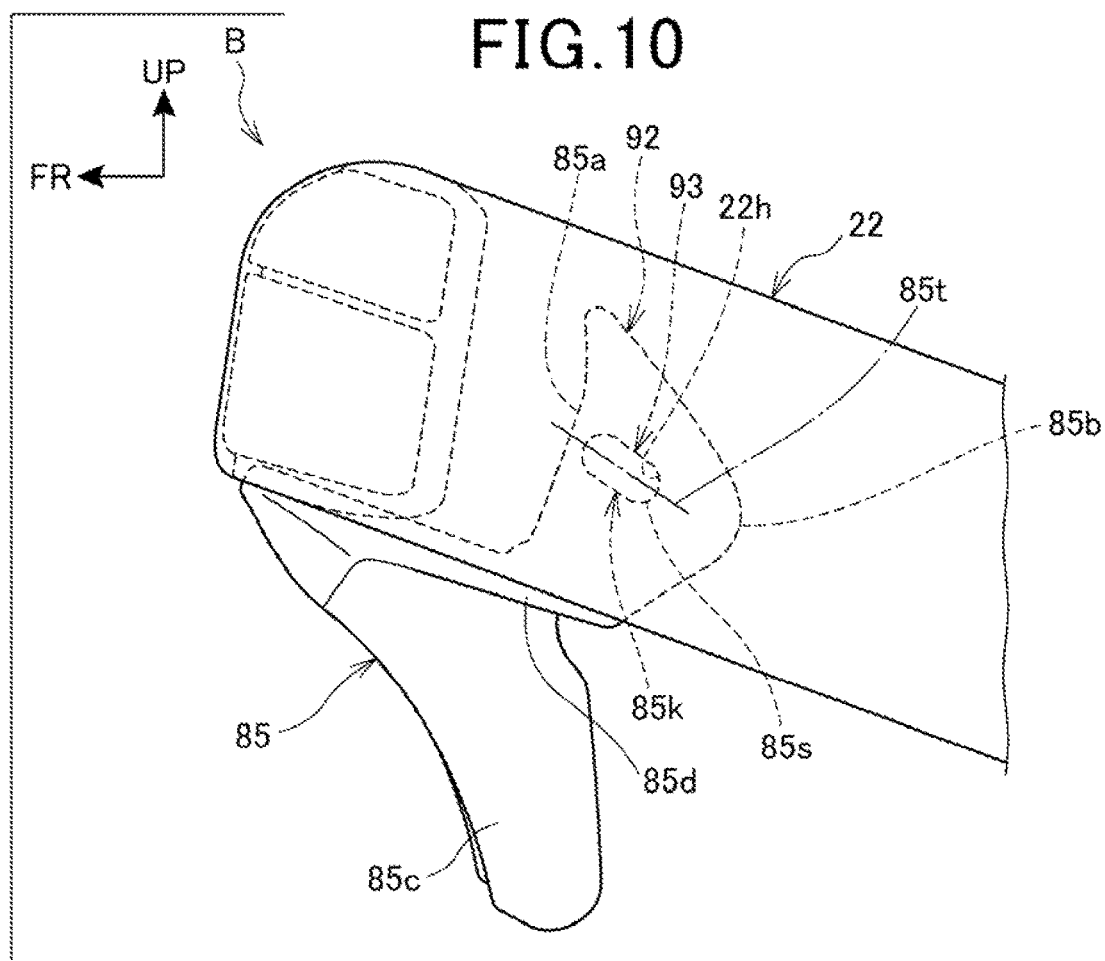
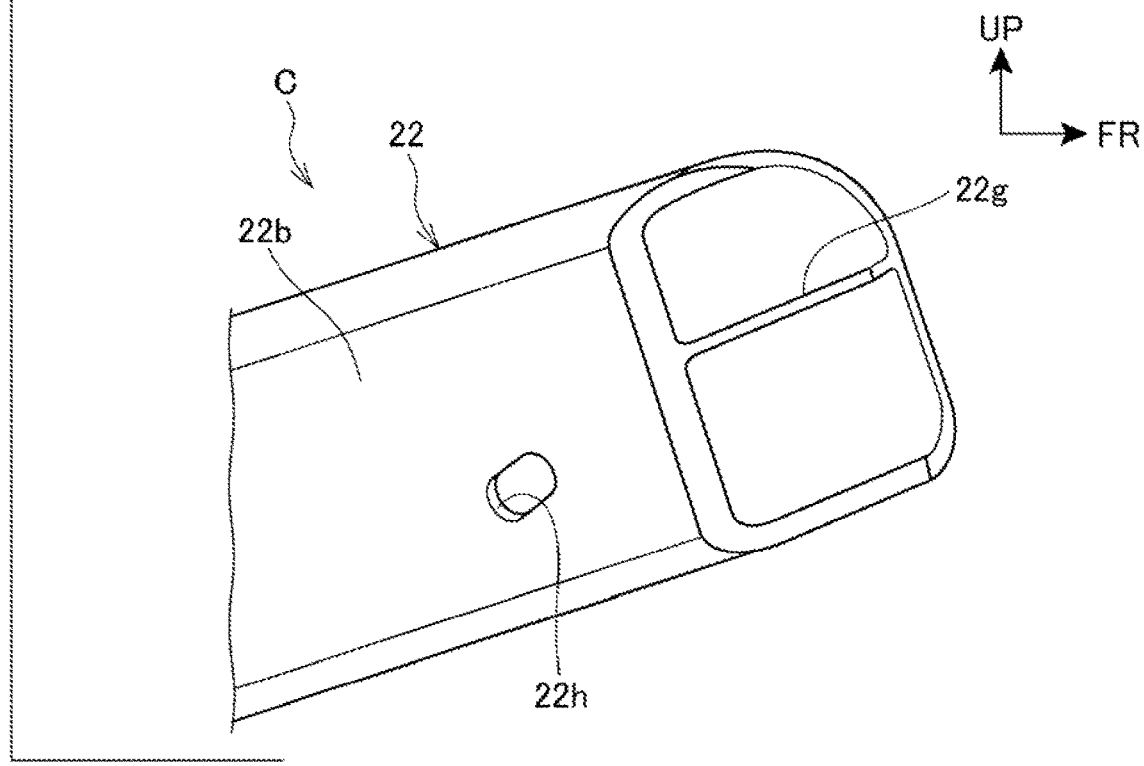

BODY FRAME OF SADDLE RIDING VEHICLE

INCORPORATION BY REFERENCE

The present application claims priority under 35 U.S.C. § 119 to Japanese Patent Application No. 2019-111248 filed on Jun. 14, 2019. The content of the application is incorporated herein by reference in its entirety.

TECHNICAL FIELD

The present invention relates to a body frame of a saddle riding vehicle.

BACKGROUND ART

Conventionally, there has been known a body frame in which a gusset of the rear surface portion of the down frame is enlarged to keep the strength since a large stress is applied when a reinforcement member is arranged in the rear surface of the down frame (refer to Patent Literature 1 for example).

Also, there has been known a body frame in which the upper end portions of the left and right pivot plates are connected to the rear portions of the left and right main frames respectively and the upper end portions of the left and right pivot plates are connected to each other by the upper cross member that supports the upper end portion of the buffer (refer to Patent Literature 2 for example).

CITATION LIST

Patent Literature

[Patent Literature 1] Japanese Patent No. 5765114
[Patent Literature 2] Japanese Patent No. 5618856

SUMMARY OF INVENTION

Technical Problem

In the body frame of Patent Literature 1, when the cross section of the body frame is made smaller or the thin thickness portion is increased for weight reduction and improvement of steering stability, there is a case the stress is concentrated on the joining portion of the body frame, the vicinity of the joining portion, and so on because of deflection of the body frame.

Further, in the body frame of Patent Literature 2 also, stress concentration of the connection portion of the body frame is concerned similarly to Patent Literature 1.

In Patent Literature 1 and Patent Literature 2 described above, it is desired to suppress the stress concentration of the body frame and to secure the strength.

The object of the present invention is to provide a body frame of a saddle riding vehicle capable of weight reduction and improvement of steering stability while suppressing stress concentration of the body frame.

Solution to Problem

The body frame is a body frame of a saddle riding vehicle in which a pair of left and right main frames (22) extend downward to the rear from an upper portion of a head pipe (21) and a down frame (26) extends downward to the rear from a lower portion of the head pipe (21), wherein a reinforcement member (85) joined to the head pipe (21) is arranged, and the reinforcement member (85) includes a vertical wall portion (85a) and lower extension portions (85c), the vertical wall portion (85a) being disposed between inner side wall portions (22x) of the left and right main frames (22), the lower extension portions (85c) extending downward from the vertical wall portion (85a) and being joined to side surfaces (26b) of the down frame (26).

In the configuration described above, it may be configured that: the down frame (26) is formed into a trapezoidal shape in cross section including a front wall portion (26g), a rear wall portion (26f), and a pair of left and right side wall portions (26h), the rear wall portion (26f) facing the rear of the front wall portion (26g), the side wall portions (26h) connecting both ends of each of the front wall portion (26g) and the rear wall portion (26f) to each other; the rear wall portion (26f) corresponding to an upper side of the trapezoidal shape is narrower in width in the vehicle width direction compared to the front wall portion (26g) corresponding to a lower side of the trapezoidal shape; and the lower extension portions (85c) of the reinforcement member (85) are joined to the side surfaces (26b) of the left and right side wall portions (26h).

Also, in the configuration described above, it may be configured that the reinforcement member (85) is a forged product.

Also, in the configuration described above, it may be configured that the lower extension portions (85c) of the reinforcement member (85) are arranged so as to gradually become narrower in width as going downward along the left and right side wall portions (26h) of the down frame (26), and a rear edge (85e) of the lower extension portion (85c) inclines with respect to the longitudinal direction of the down frame (26).

Also, in the configuration described above, it may be configured that a positioning portion (93) is arranged in a mating portion (92) of the main frame (22) and the reinforcement member (85), the positioning portion (93) positioning the main frame (22) and the reinforcement member (85).

Also, in the configuration described above, it may be configured that the reinforcement member (85) includes a pair of left and right upper extension portions (85b) that extend rearward along the inner side wall portions (22x) of each of the main frames (22) from left and right ends of the vertical wall portion (85a) and are joined to the inner side wall portions (22x).

Also, in the configuration described above, it may be configured that the head pipe (21) includes an upper extension portion (21a) and a lower extension portion (21c), the upper extension portion (21a) extending along the inner side wall portions (22x) from upper wall portions (22w) of the main frames (22), the lower extension portion (21c) extending along the side wall portions (26h) of the down frame (26), the upper extension portion (21a) is joined to the vertical wall portion (85a) of the reinforcement member (85), and the lower extension portion (21c) is joined to the side wall portions (26h) of the down frame (26).

Also, in the configuration described above, it may be configured that pivot frames (23) extending downward respectively are connected to rear end portions of the left and right main frames (22), a pair of left and right lower frames (28) are connected to a lower end portion of the down frame (26) through a front joint (27), rear end portions of the left and right lower frames (28) are respectively connected to the pivot frames (23), and connection portions (27n) of the front joint (27) to the down frame (26) are widened toward the front and are connected to the rear wall portion (26*f*) and the left and right side wall portions (26*h*) of the down frame (26).

Also, in the configuration described above, it may be configured that respective upper end portions of the left and right pivot frames (23) are connected to each other by a cushion upper bracket (54), one end portion of a cushion unit (55) being connected to the cushion upper bracket (54), the cushion unit (55) relaxing impact propagated from a rear wheel (16), and rear ends (22*j*) of the main frames (22) are positioned behind connection portions (11C) of the cushion upper bracket (54) to the pivot frames (23) in a side view, the rear ends (22*j*) of the main frames (22) being connected to respective upper end portions of the left and right pivot frames (23).

Advantageous Effects of Invention

With respect to the body frame, the reinforcement member joined to the head pipe is arranged, and the reinforcement member includes the vertical wall portion and the lower extension portions, the vertical wall portion being disposed between the inner wall portions of the left and right main frames, the lower extension portions extending downward from the vertical wall portion and being joined to the side surfaces of the down frame. Therefore, by joining the lower extension portions to the side surfaces of the down frame, a load applied from the head pipe to the down frame can be received by the lower extension portions, stress concentration on the rear surface of the down frame can be suppressed, and strength of the body frame can be secured.

In the configuration described above, the down frame is formed into a trapezoidal shape in cross section including the front wall portion, the rear wall portion, and a pair of the left and right side wall portions, the rear wall portion facing the rear of the front wall portion, the side wall portions connecting both ends of each of the front wall portion and the rear wall portion to each other, the rear wall portion corresponding to the upper side of the trapezoidal shape is narrower in width in the vehicle width direction compared to the front wall portion corresponding to the lower side of the trapezoidal shape, and the lower extension portions of the reinforcement member are joined to the side surfaces of the left and right side wall portions. Therefore, by making the cross section of the down frame to have the trapezoidal shape, the mating surface with the down frame becomes excellent without machining work of the reinforcement member. Also, it is possible to reduce the cross-sectional area of the down frame and to allow the entire body frame to have a constant rigidity without being excessively enhanced, and ride comfort and steering stability can be improved.

Also, in the configuration described above, the reinforcement member is a forged product. Therefore, the reinforcement member connected to the head pipe, the left and right main frames, and the down frame can be formed integrally, and can be made to be thin and compact since the reinforcement member is made a forged product. Also, since the cross section of the down frame has a trapezoidal shape, the mating surface with the down frame becomes excellent without machining work of the reinforcement member.

Also, in the configuration described above, the lower extension portions of the reinforcement member are arranged so as to gradually become narrower in width as going downward along the left and right side wall portions of the down frame, and the rear edge of the lower extension portion inclines with respect to the longitudinal direction of the down frame. Therefore, since the down frame and the reinforcement member cross obliquely, stress is relaxed, and strength improves.

Also, in the configuration described above, the positioning portion is arranged in the mating portion of the main frame and the reinforcement member, the positioning portion positioning the main frame and the reinforcement member. Therefore, positioning of the main frames and the reinforcement member becomes easy, and assembling performance can be improved.

Also, in the configuration described above, the reinforcement member includes a pair of the left and right upper extension portions that extend rearward along the inner wall portions of each of the main frames from the left and right ends of the vertical wall portion and are joined to the inner wall portions. Therefore, the connection portion of the head pipe and the left and right main frames can be reinforced.

Also, in the configuration described above, the head pipe includes the upper extension portion and the lower extension portion, the upper extension portion extending along the inner wall portions from the upper wall portions of the main frames, the lower extension portion extending along the side wall portions of the down frame, the upper extension portion is joined to the vertical wall portion of the reinforcement member, and the lower extension portion is joined to the side wall portions of the down frame. Therefore, the joint strength of the head pipe and the down frame and the reinforcement member can be increased.

Also, in the configuration described above, the pivot frames extending downward respectively are connected to the rear end portions of the left and right main frames, a pair of the left and right lower frames are connected to the lower end portion of the down frame through the front joint, the rear end portions of the left and right lower frames are respectively connected to the pivot frames, and the connection portions of the front joint to the down frame are widened toward the front and are connected to the rear wall portion and the left and right side wall portions of the down frame. Therefore, with respect to the front joint also, the trapezoidal shape in cross section of the down frame allows the mating surface with the front joint to be excellent similarly to the mating surface with the reinforcement member.

Also, in the configuration described above, respective upper end portions of the left and right pivot frames are connected to each other by the cushion upper bracket, one end portion of the cushion unit being connected to the cushion upper bracket, the cushion unit relaxing impact propagated from the rear wheel, and the rear ends of the main frames are positioned behind the connection portions of the cushion upper bracket to the pivot frames in a side view, the rear ends of the main frames being connected to respective upper end portions of the left and right pivot frames. Therefore, by allowing the connection portions of the main frames and the pivot frames to escape from the connection portion of the cushion upper bracket to which a load is applied from the cushion unit, the stress applied to the connection portions can be suppressed, the strength of the body frame can be secured, and the load described above can be supported efficiently by the main frames. Further, a lightening portion can be formed in the portions where the main frames and the pivot frames overlap, and weight reduction can be achieved.

BRIEF DESCRIPTION OF DRAWINGS

FIG. 10 is a drawing that shows a positioning structure of left and right main frames and the gusset, the state drawing B is a left side view that shows a state where the gusset has been positioned with respect to the left and right main frames, and the state drawing C is a right side view that shows the inner surfaces of the main frame.

DESCRIPTION OF EMBODIMENT

Figure 1:
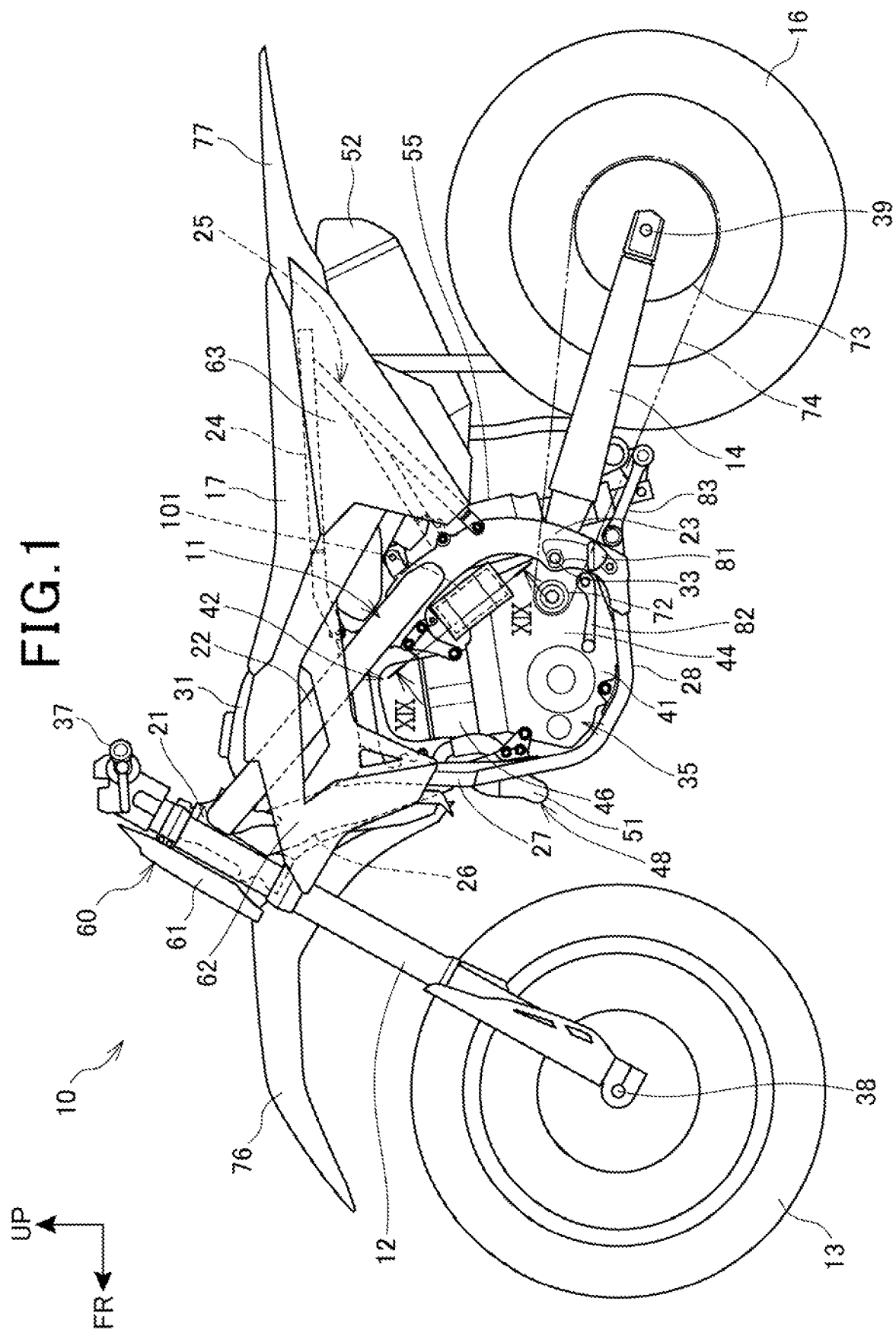
FIG. 1 is a left side view that shows a motorcycle including a body frame of an embodiment of the present invention.

An embodiment of the present invention will be hereinafter explained referring to the drawings. Also, in the explanation, description of the direction such as the front, rear, left, right, up, and down is the same as the direction with respect to the vehicle body of a motorcycle 10 unless a specific description is given. Also, a sign FR shown in each drawing represents vehicle body forward, a sign UP represents vehicle body upward, and a sign LH represents vehicle body left hand.

Figure 2:
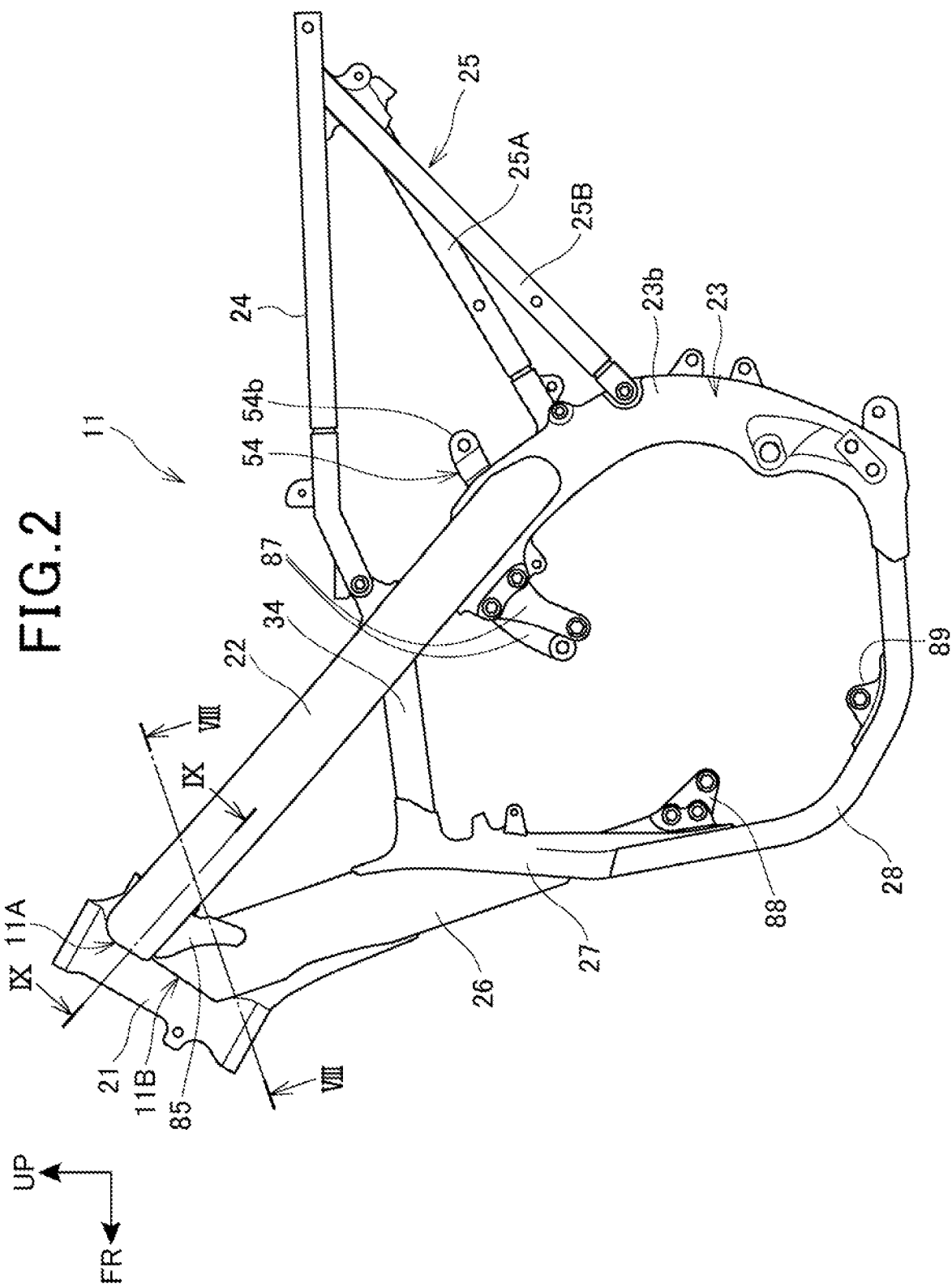
FIG. 2 is a left side view that shows the body frame.

FIG. 1 is a left side view that shows the motorcycle 10 including a body frame 11 of an embodiment of the present invention, and FIG. 2 is a left side view that shows the body frame 11.

As shown in FIG. 1, the motorcycle 10 includes a front wheel 13, a rear wheel 16, and a seat 17, the front wheel 13 being supported by the front end portion of the body frame 11 through front forks 12, the rear wheel 16 being supported by the lower portion of the rear portion of the body frame 11 though a swing arm 14, the seat 17 being supported by the upper portion of the body frame 11. Thus, the motorcycle 10 is a saddle riding vehicle on which a rider rides straddling the seat 17.

As shown in FIG. 1 and FIG. 2, the body frame 11 includes a head pipe 21, a pair of left and right main frames 22, a pair of left and right pivot frames 23, a pair of left and right seat frames 24, a sub-frame 25, a down frame 26, a front joint 27, and a pair of left and right lower frames 28.

The head pipe 21 configures the front end portion of the body frame 11, and steerably supports the front forks 12. The left and right main frames 22 extend obliquely downward to the rear from the upper portion of the head pipe 21, and support a fuel tank 31 that is disposed in front of the seat 17. The left and right pivot frames 23 extend downward while respectively curving from the rear end portion of the left and right main frames 22 so as to project to the rear. Between the left and right pivot frames 23, a pivot shaft 33 is extended, the pivot shaft 33 swingably supporting the front end portion of the swing arm 14.

The left and right seat frames 24 respectively extend rearward from the left and right main frames 22, and support the seat 17.

The sub-frame 25 includes a pair of left and right upper frames 25A and a pair of left and right lower frames 25B, and the left and right upper frames 25A and the left and right lower frames 25B are respectively connected to the upper portions of the left and right pivot frames 23 and the rear portions of the left and right seat frames 24.

The down frame 26 extends downward and obliquely rearward below the left and right main frames 22 from the lower portion of the rear portion of the head pipe 21, and the lower end portion of the down frame 26 is connected to the left and right lower frames 28 through the front joint 27.

With respect to the front joint 27, the lower portion is bifurcated and is connected to the left and right lower frames 28. The upper portion of the front joint 27 and the left and right main frames 22 are connected to each other by a reinforcement pipe 34 that curves forward in a projected shape. The reinforcement pipe 34 configures a part of the body frame 11, and extends in the vehicle longitudinal direction in a vehicle side view with both end portions being respectively connected to the left and right main frames 22.

The left and right lower frames 28 respectively extend downward from the lower end portion of the front joint 27, further extend rearward, and are connected respectively to the lower end portions of the left and right pivot frames 23.

An engine 35 is supported by the left and right main frames 22, the front joint 27, and the left and right lower frames 28.

In FIG. 1, the front forks 12 support a handlebar 37 at the upper end portion thereof, and support the front wheel 13 at the lower end portion through a front axle 38. The swing arm 14 supports the rear wheel 16 at the rear end portion through a rear axle 39.

The engine 35 includes a crankcase 41 and a cylinder portion 42, the cylinder portion 42 extending upward from the upper portion of the front portion of the crankcase 41.

At the rear portion of the crankcase 41, a transmission 44 is arranged in an integral manner.

The cylinder portion 42 includes a cylinder head 46, an intake device (not illustrated) is connected to the rear portion of the cylinder head 46, and an exhaust device 48 is connected to the front portion. The exhaust device 48 includes an exhaust pipe 51 and a muffler 52, the exhaust pipe 51 being connected to the cylinder head 46, the muffler 52 being connected to the rear end portion of the exhaust pipe 51.

Between the upper end portions of the left and right pivot frames 23, a cushion upper bracket 54 (refer to FIG. 2 and FIG. 11) extending in the vehicle width direction is stretched, and the upper end portion of a cushion unit 55 is connected to the cushion upper bracket 54, the cushion unit 55 being a buffer that relaxes impact propagated from the rear wheel 16 to the body frame 11.

A part of the body frame 11 is covered by a body cover 60.

The body cover 60 is configured of a front cover 61, a pair of left and right radiator shrouds 62, a pair of left and right side covers 63, and the like.

The front cover 61 covers the upper portion of the front forks 12 from the front. The front cover 61 is attached to the front forks 12 through a stay (not illustrated). The left and right radiator shrouds 62 cover a radiator (not illustrated), the upper portion of the left and right main frames 22, the down frame 26, and the upper portion of the front joint 27 from the lateral side. The left and right side covers 63 cover the left and right seat frames 24 and the sub-frame 25 from the lateral side.

A drive sprocket 72 is attached to the output shaft of the transmission 44, a driven sprocket 73 is attached to the rear wheel 16, a chain 74 is stretched between the drive sprocket 72 and the driven sprocket 73, and power is transmitted from the transmission 44 to the rear wheel 16 through the chain 74.

The front wheel 13 is covered by a front fender 76 from above. The rear wheel 16 is covered by a rear fender 77 from above. In the lower end portion of the pivot frames 23, a rider's step 81 is arranged. A gear change pedal 82 is disposed in front of the rider's step 81.

The lower end portion of the cushion unit 55 is connected to a link mechanism 83 that is connected to the lower end portion side of the left and right pivot frames 23 and the swing arm 14.

A battery device 84 is attached to the upper portion of the pivot frame 23 on one side (the left side), a battery 101 being stored in the battery device 84.

In FIG. 2, the front portion of the body frame 11 is reinforced by a gusset 85. The gusset 85 reinforces a pair of left and right connection portions 11A and a connection portion 11B respectively, the head pipe 21 and the left and right main frames 22 being connected by the connection portions 11A, the head pipe 21 and the down frame 26 being connected by the connection portions 11B.

The gusset 85 is a forged product formed by forging, and is joined to the head pipe 21, the left and right main frames 22, and the down frame 26 by welding. Since the gusset 85 is not subjected to machining work, the cost of the gusset 85 is suppressed.

On the lower side of the upper end portion of the left and right pivot frames 23, a pair of left and right upper engine hangers 87 are arranged, the left and right upper engine hangers 87 respectively supporting the upper portion of the engine 35 (refer to FIG. 1). In the lower portion of the front joint 27, a pair of left and right front engine hangers 88 are arranged, the left and right front engine hangers 88 respectively supporting the front portion of the engine 35. In the left and right lower frames 28, a pair of left and right lower engine hangers 89 are arranged, the left and right lower engine hangers 89 respectively supporting the lower portion of the engine 35.

The cushion upper bracket 54 includes a bracket body 54a and a pair of left and right cushion support arm portions 54b in an integral manner, the bracket body 54a having a bar shape extending in the vehicle width direction (refer to FIG. 11), the left and right cushion support arm portions 54b being extended upward and obliquely to the rear from the bracket body 54a in order to swingably support the upper end portion of the cushion unit 55 (refer to FIG. 1).

Figure 3:
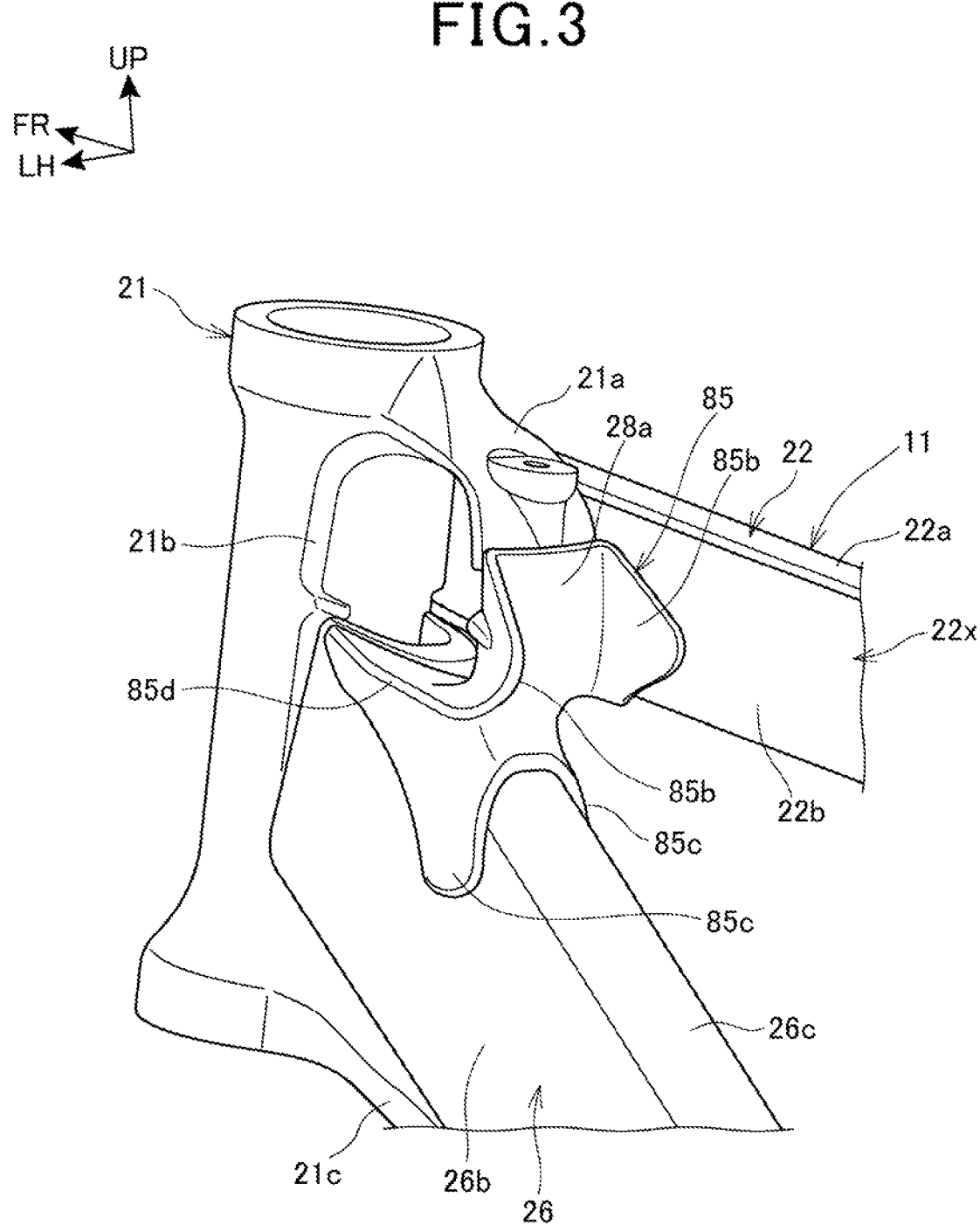
FIG. 3 is a perspective view that shows a gusset and its surroundings.

FIG. 3 is a perspective view that shows the gusset 85 and its surroundings.

Also, in FIG. 3, one (the left side) main frame 22 is omitted for the sake of convenience.

Figure 4:
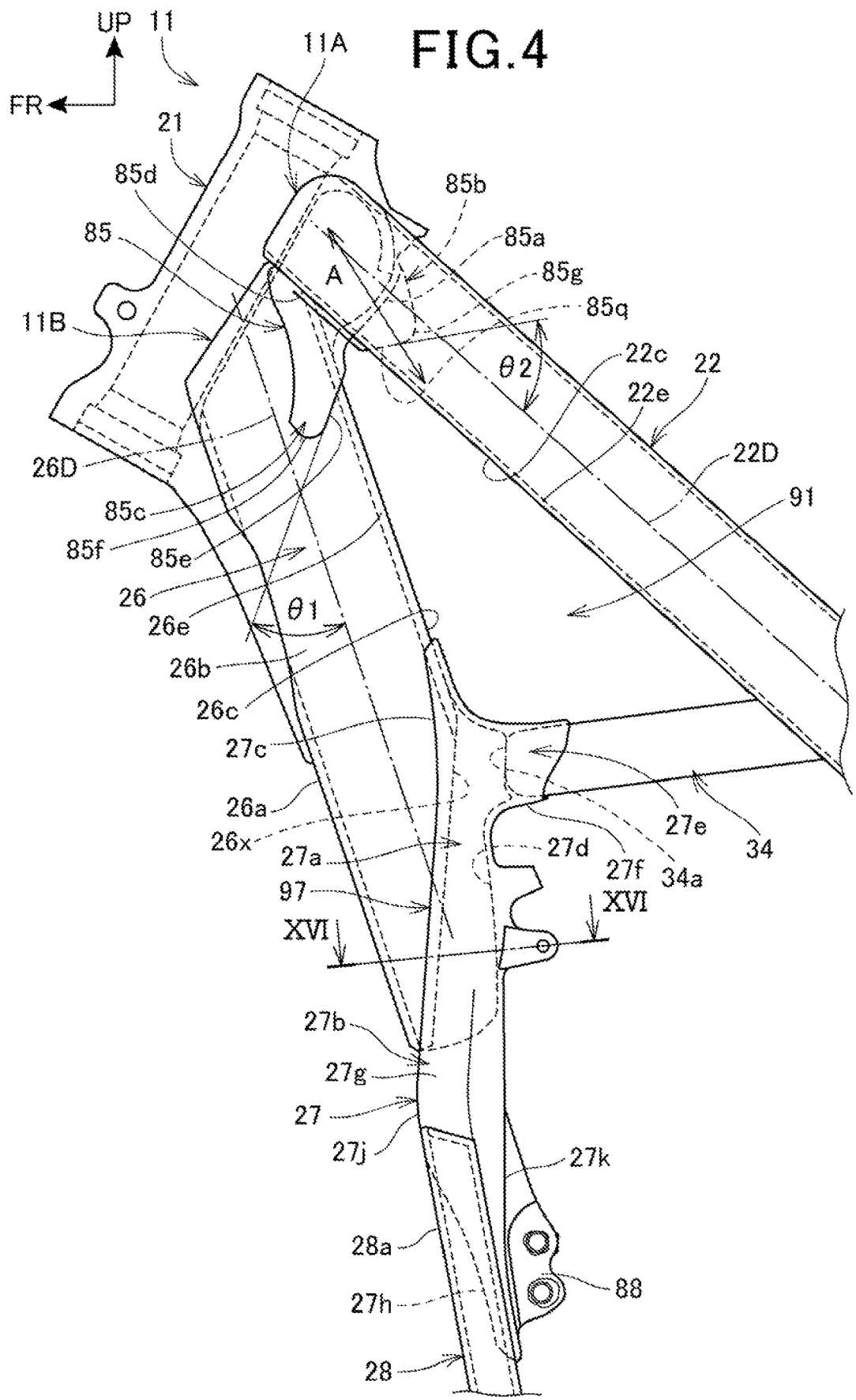
FIG. 4 is a left side view that shows the front portion of the body frame.

The head pipe 21 includes an upper extension portion 21a, an upper bulging portion 21b, and a lower extension portion 21c in an integral manner, the upper extension portion 21a extending rearward from the rear portion of the upper end portion, the upper bulging portion 21b being made to bulge for allowing respective front end surfaces of the left and right main frames 22 to hit and be joined to the upper bulging portion 21b, the lower extension portion 21c extending downward and obliquely rearward from the rear portion of the lower end portion (refer to FIG. 4 also).

The upper extension portion 21a extends so as to gradually curve lower than upper surfaces 22a of the left and right main frames 22 as it goes rearward. To the lower end portion of the upper extension portion 21a, the gusset 85 is joined.

The lower extension portion 21c extends downward to the rear along a front surface 26a (refer to FIG. 4) of the down frame 26, and is joined to the front surface 26a and a part of outer side surfaces 26b on both sides (refer to FIG. 4 also).

The gusset 85 includes a center wall portion 85a, a pair of left and right upper extension portions 85b, a pair of left and right lower extension portions 85c, and a pair of left and right sideways extension portions 85d (one sideways extension portion 85d only is illustrated) in an integral manner.

The upper end portion of the center wall portion 85a is joined to the rear end portion of the upper extension portion 21a of the head pipe 21 from the rear, and the lower end portion of the center wall portion 85a is joined to a rear surface 26c of the down frame 26.

The left and right upper extension portions 85b respectively extend rearward from the upper lateral side edge of the center wall portion 85a, and are joined to inner side surfaces 22b of the left and right main frames 22.

The left and right lower extension portions 85c respectively extend forward and downward from the left and right lower lateral side edges of the center wall portion 85a, and are joined to the left and right outer side surfaces 26b (one outer side surface 26b only is illustrated) of the down frame 26.

The left and right sideways extension portions 85d respectively extend sideways from respective upper edges of the left and right upper extension portions 85b and respective upper edges of the left and right lower extension portions 85c, and are joined to lower surfaces 22c (refer to FIG. 4) of the left and right main frames 22.

FIG. 4 is a left side view that shows the front portion of the body frame 11.

In a vehicle side view, the left and right main frames 22, the down frame 26, the front joint 27, and the reinforcement pipe 34 form a triangular closed space 91. By forming the closed space 91 and arranging the gusset 85 in such a manner, rigidity of the front portion of the body frame 11 can be enhanced. In the body frame 11, since the cross-sectional area of the left and right main frames 22 and the down frame 26 is made to be smaller compared to the past, increase of the rigidity described above is not excessive and a constant rigidity is secured, and therefore ride comfort and steering stability are improved.

The gusset 85 is joined to the head pipe 21 by the center wall portion 85a, is joined to the left and right main frames 22 by the left and right upper extension portions 85b and the left and right sideways extension portions 85d, and is joined to the down frame 26 by the left and right lower extension portions 85c. Also, an arrow A in the drawing shows the compression direction (or the die removal direction) in a forging die in forming the gusset 85 by forging.

Thus, the head pipe 21, the left and right main frames 22, and the down frame 26 were joined to each other by the gusset 85. As a result, the stress generated respectively in the connection portions 11A of the head pipe 21 and the left and right main frames 22 and the connection portion 11B of the head pipe 21 and the down frame 26 can be suppressed, and rigidity of the front portion of the body frame 11 can be enhanced.

The front joint 27 includes an upper joint portion 27*a* and a lower joint portion 27*b* in an integral manner, the upper joint portion 27*a* being made to have a plate shape, the lower joint portion 27*b* being arranged downward the upper joint portion 27*a*.

The upper joint portion 27*a* includes a recessed portion 27*d* and a rearward protrusion portion 27*e*, the recessed portion 27*d* including an opening portion 27*c* that opens forward, the rearward protrusion portion 27*e* being formed in the rear portion of the upper portion so as to protrude rearward.

To the edge portion of the opening portion 27*c* and inside the recessed portion 27*d* of the upper joint portion 27*a*, a lower end surface 26*x* is inserted, the lower end surface 26*x* being formed in the lower end portion of the down frame 26 and having a linear shape in a side view, and the edge portion of the opening portion 27*c*, the outer side surfaces 26*b* on both sides and the rear surface 26*c* of the down frame 26 are welded to each other.

The rearward protrusion portion 27*e* includes a recessed shape curved portion 27*f* extending in the vehicle width direction, and a bent front end 34*a* of the reinforcement pipe 34 is inserted and joined to the recessed shape curved portion 27*f*.

The lower joint portion 27*b* is a portion branched into the left and right, and includes a pair of left and right hollow portions 27*g* and a pair of left and right lower frame connection portions 27*h* in an integral manner, the hollow portions 27*g* being arranged in the upper portion so as to be hollow, the lower frame connection portions 27*h* being arranged downward the respective hollow portions 27*g*.

To the left and right lower frame connection portions 27*h*, the upper end portions of the left and right lower frames 28 are joined respectively. Respective front surfaces 27*j* of the left and right hollow portions 27*g* are exposed forward, and are disposed flush with front surfaces 28*a* of the upper end portion of the left and right lower frames 28.

The left and right front engine hangers 88 are disposed over the hollow portions 27*g* and the lower frame connection portions 27*h* in the height direction, and are disposed behind the upper portion of the lower frames 28, the front engine hangers 88 being arranged on respective rear surfaces 27*k* of the left and right lower joint portions 27*b*.

Figure 5:
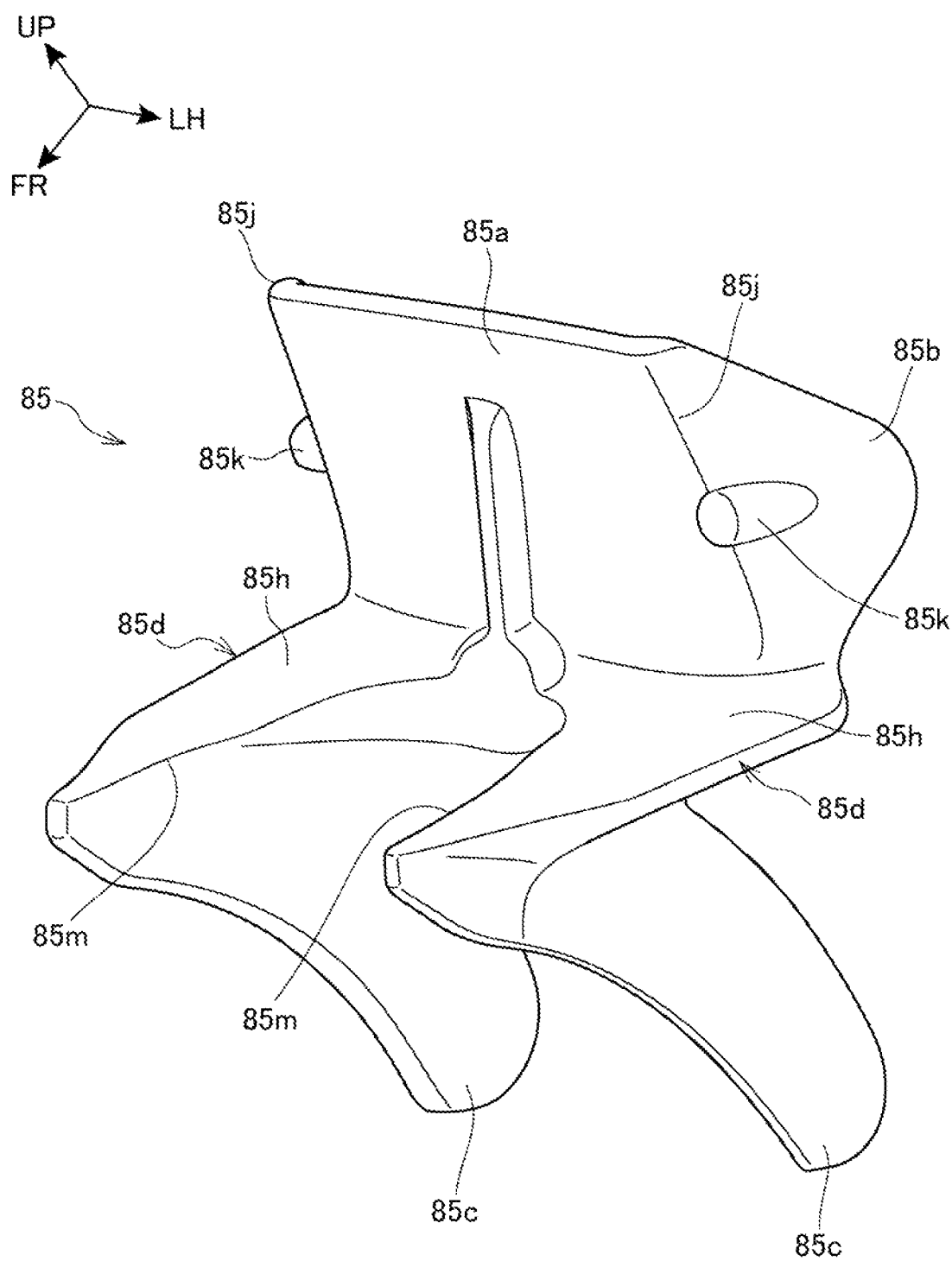
FIG. 5 is a perspective view of the gusset as seen from the oblique front side.
Figure 6:
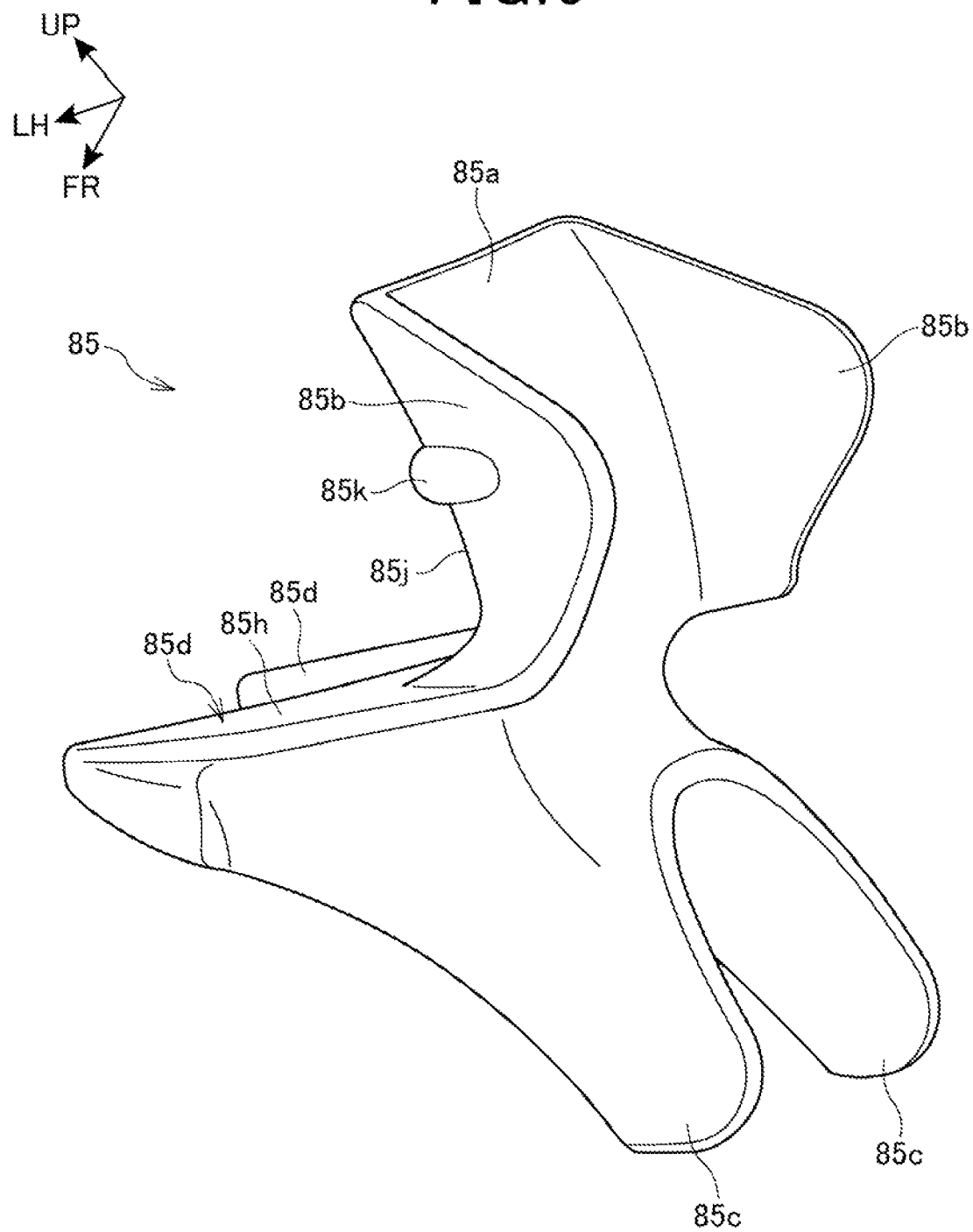
FIG. 6 is a perspective view of the gusset as seen from the oblique rear side.

FIG. 5 is a perspective view of the gusset 85 as seen from the oblique front side, and FIG. 6 is a perspective view of the gusset 85 as seen from the oblique rear side.

As shown in FIG. 5 and FIG. 6, with respect to the center wall portion 85*a*, the upper portion is generally flat, and the lower portion gradually curves rearward as it goes downward.

The left and right upper extension portions 85*b* extend so as to be gradually widened sideways as going obliquely downward to the rear (the direction along which the main frames 22 (refer to FIG. 3) extend) from the center wall portion 85*a*.

For positioning with the left and right main frames 22 (refer to FIG. 4) from corner portions 85*j* on both sides of the center wall portion 85*a* and the left and right upper extension portions 85*b* over to the left and right upper extension portions 85*b*, protrusions 85*k* are respectively arranged in an integral manner.

Left and right sideways extension portions 85*d* include flat-shape upper surfaces 85*h* extending forward along the lower surfaces 22*c* (refer to FIG. 4) of the main frames 22, and are formed into a tapered shape with the width in the vehicle width direction gradually becoming narrow as going forward. Respective inner edges 85*m* of the left and right sideways extension portions 85*d* are made to jointly form a U-shape.

A pair of left and right lower extension portions 85*c* extend so as to gradually be widened sideways (outward in the vehicle width direction) as going downward from the center wall portion 85*a* and the left and right sideways extension portions 85*d*.

In FIG. 4, rear edges 85*e* of the left and right lower extension portions 85*c* of the gusset 85 are formed into a linear shape. In a vehicle side view, the rear edges 85*e* extend obliquely with respect to a center line 26D that passes the center of the width in the vehicle longitudinal direction of the down frame 26. In other words, the rear edges 85*e* incline upward to the rear in a vehicle side view.

An angle θ1 formed by the rear edge 85*e* and the center line 26D is set to less than 90° (acute angle), preferably 60° or less, and more preferably 30° to 60°. Also, the center line (neutral line) 26D is located on a neutral plane where neither extension nor shrinkage occurs when the down frame 26 is bent in the vehicle longitudinal direction. Respective front ends 85*f* of the left and right lower extension portions 85*c* of the gusset 85 are close to the center line 26D.

Also, the left and right upper extension portions 85*b* of the gusset 85 overlap with center lines 22D that pass the respective centers of the width in the vertical direction of the left and right main frames 22 in a vehicle side view, and respective front ends 85*g* of the left and right upper extension portions 85*b* are close to the center lines 22D. Further, the center line (neutral line) 22D is located on a neutral plane of the main frame 22.

Also, lower oblique sides 85*q* of the left and right upper extension portions 85*b* of the gusset 85 are formed into a linear shape. In a vehicle side view, the oblique sides 85*q* extend obliquely with respect to the center line 22D of the main frame 22. An angle θ2 formed by the oblique sides 85*q* and the center line 22D is set to less than 90°, preferably 60° or less, and more preferably 30° to 60°.

As shown in FIG. 3 and FIG. 4, the front ends 85*f* of the lower extension portions 85*c* and the front ends 85*g* of the upper extension portions 85*b* described above become the end portion of welding, and are portions that are liable to generate stress concentration. By allowing these front ends 85*f*, 85*g* to be close to the center lines 26D, 22D that are positioned on the respective neutral planes where the stress of the down frame 26 and the main frame 22 is suppressed, the stress generated can be suppressed, and the strength of the front portion of the body frame 11 can be improved.

Also, since the edge portions (the rear edges 85*e* and the oblique sides 85*q*) of the gusset 85 obliquely cross corner portions 22*e* of the main frames 22 and corner portions 26*e* of the down frame 26 where a high stress is liable to be generated, the direction of the main stress generated in the main frame 22 and the down frame 26 (the direction along the ridge line of the corner portions 22*e*, 26*e*) and the direction of the weld bead can be shifted obliquely, and the strength can be improved.

Further, since the weld joint of the center wall portion 85a, the left and right upper extension portions 85b, the left and right lower extension portions 85c, and the left and right sideways extension portions 85d of the gusset 85 and the head pipe 21, the left and right main frames 22, and the down frame 26 is a lap joint, stress concentration to the welded portion can be suppressed compared to the T-joint for example where welding is executed in a T-shape.

Figure 7:
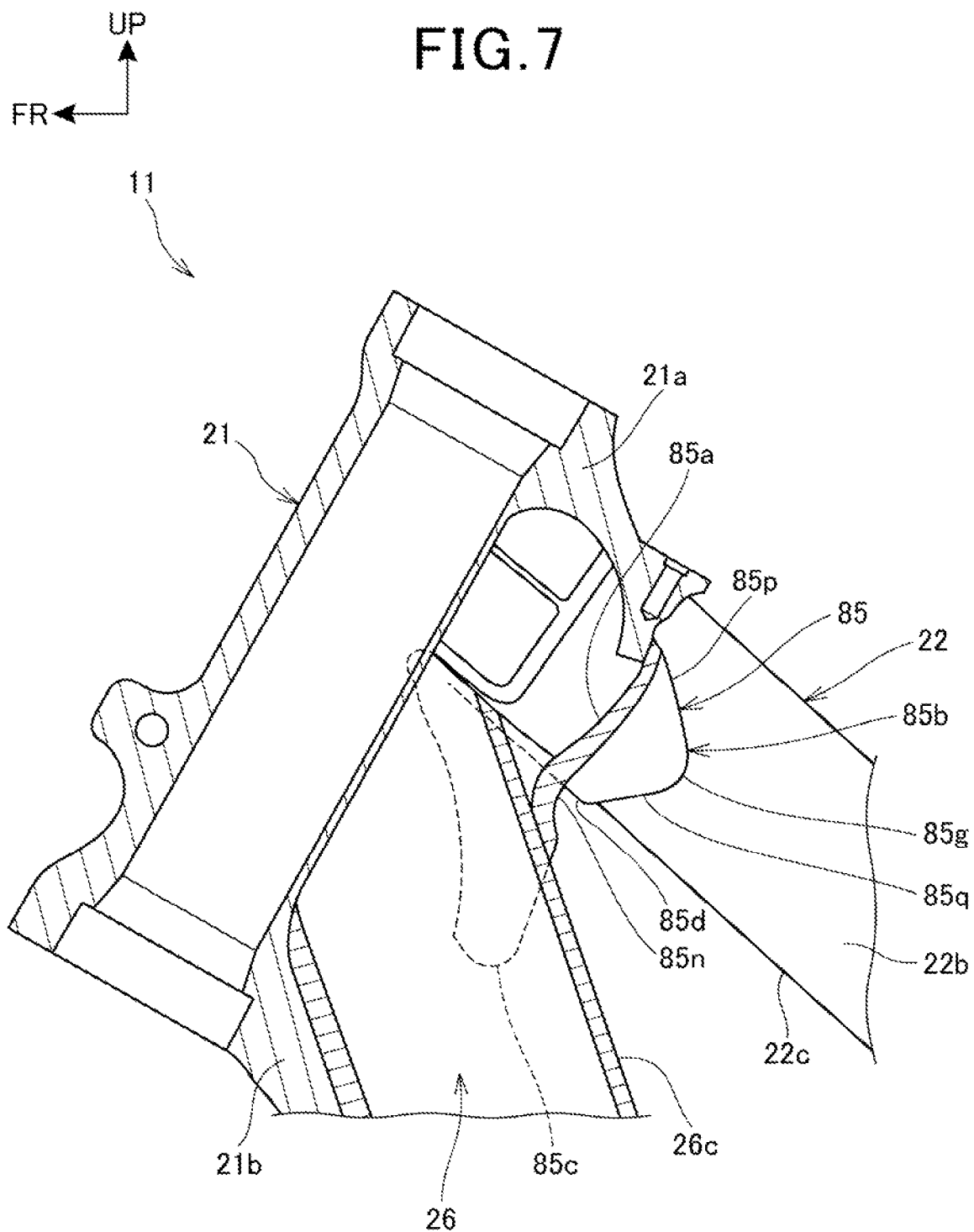
FIG. 7 is a cross-sectional view when the front portion of the body frame is cut along the vehicle body center line.
Figure 8:
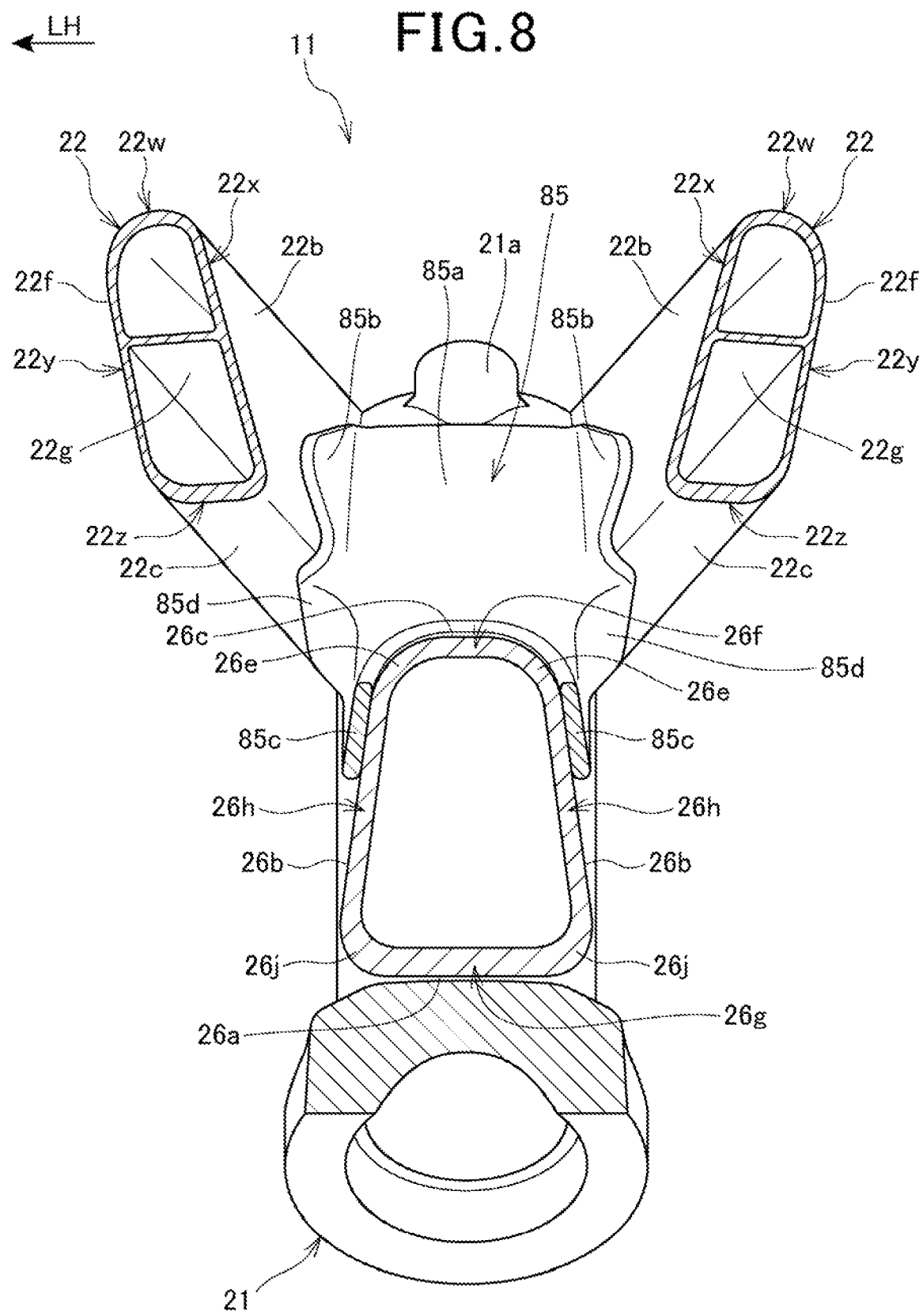
FIG. 8 is a cross-sectional view taken along the line VIII-VIII of FIG. 2.
Figure 9:
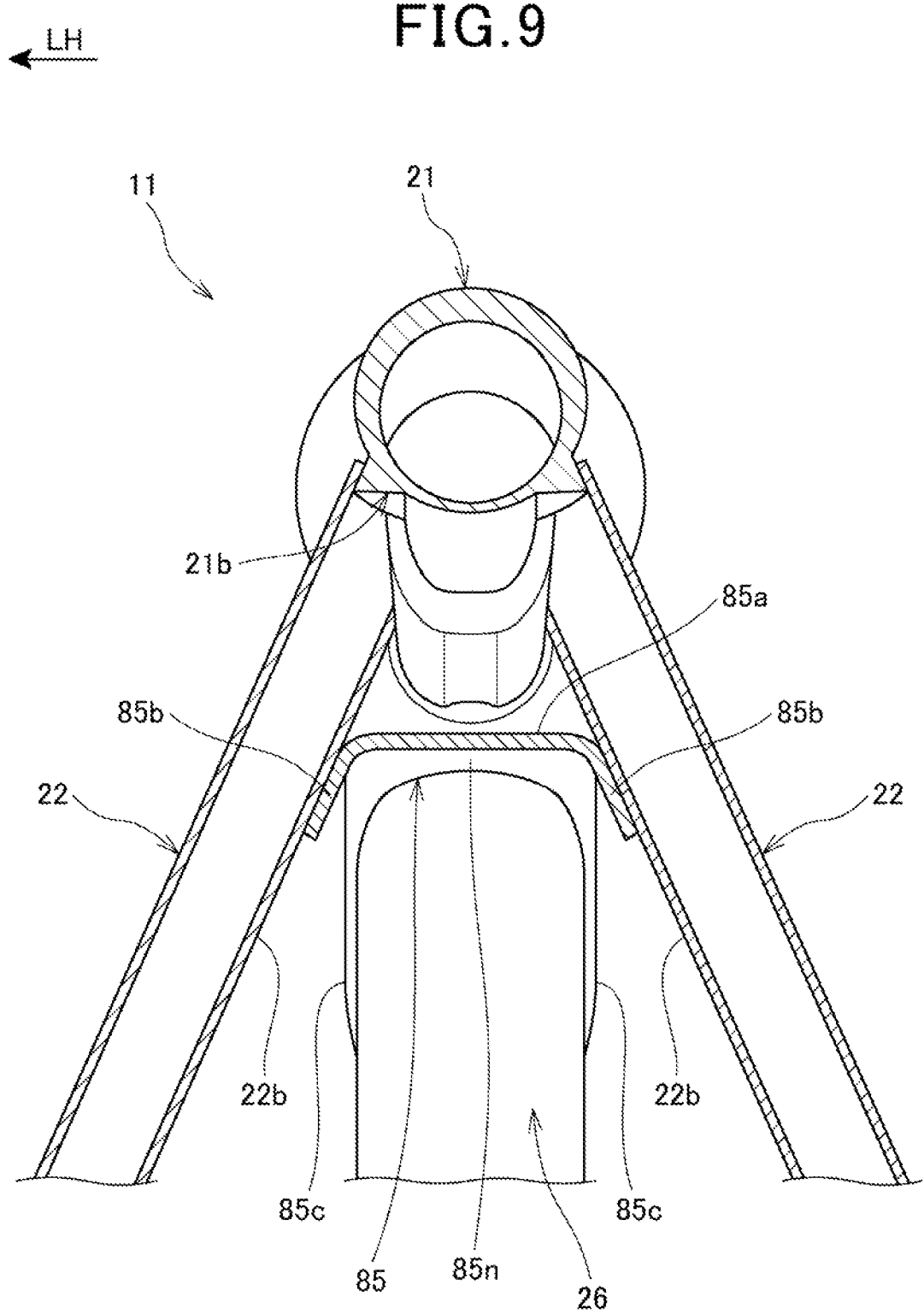
FIG. 9 is a cross-sectional view taken along the line IX-IX of FIG. 2.

FIG. 7 is a cross-sectional view when the front portion of the body frame 11 is cut along the vehicle body center line, FIG. 8 is a cross-sectional view taken along the line VIII-VIII of FIG. 2, and FIG. 9 is a cross-sectional view taken along the line IX-IX of FIG. 2.

As shown in FIG. 7, the center wall portion 85a includes a lower curved portion 85n in the lower portion, the lower curved portion 85n extending downward from the upper end side and thereafter curving rearward, and the lower curved portion 85n is joined to the rear surface 26c of the down frame 26.

The left and right upper extension portions 85b (one upper extension portion 85b only is illustrated) are respectively formed into a generally triangular shape in a vehicle side view, an oblique side 85p on the upper side extends downward and obliquely rearward from the center wall portion 85a, and the oblique side 85q on the lower side extends upward and obliquely rearward from the center wall portion 85a side. Since the front end 85g that is the corner portion between the two oblique sides 85p, 85q is formed into an arc shape that projects rearward and the front end 85g is close to the center line 22D (refer to FIG. 4), the stress generated at the front end 85g can be reduced.

To the oblique sides 85q on the lower side, the left and right sideways extension portions 85d continue.

The left and right sideways extension portions 85d are joined to the lower surfaces 22c of the main frames 22.

As shown in FIG. 8, the main frame 22 is formed to have a rectangular cross section, and includes a connection portion 22g having a flat plate shape reinforcing the center portion in the vertical direction.

The main frame 22 includes an upper wall portion 22w, an inner side wall portion 22x, an outer wall portion 22y, a lower wall portion 22z, and the connection portion 22g in an integral manner, the upper wall portion 22w being positioned in the upper portion, the inner side wall portion 22x including the inner side surface 22b, the outer wall portion 22y including an outer side surface 22f, the lower wall portion 22z being positioned in the lower portion, the connection portion 22g connecting the inner side wall portion 22x and the outer wall portion 22y.

The down frame 26 is formed into a bilaterally symmetric trapezoidal shape in cross section, and includes a rear wall portion 26f, a front wall portion 26g, and a pair of left and right side wall portions 26h corresponding to the upper side, the lower side, and two legs (oblique sides) facing each other of the trapezoidal shape. A pair of the left and right corner portions 26e on the rear side and a pair of left and right corner portions 26j on the rear side of the down frame 26 are respectively formed into an arc shape, and the left and right corner portions 26e are formed into an arc with a larger radius compared to the left and right corner portions 26j.

The front wall portion 26g has a thicker plate thickness compared to the rear wall portion 26f, and extends to the outer side in the vehicle width direction compared to the rear wall portion 26f.

The left and right side wall portions 26h incline so that the interval between the left and right gradually becomes narrow as going rearward, and the left and right lower extension portions 85c of the gusset 85 are respectively joined to the left and right side wall portions 26h. The left and right lower extension portions 85c incline so as to line the left and right side wall portions 26h.

As shown in FIG. 9, the front end portions of the left and right main frames 22 are joined to the upper bulging portion 21b of the head pipe 21.

Also, the left and right upper extension portions 85b are formed into a shape that is gradually widened as going rearward so as to line the respective inner side surfaces 22b of the left and right main frames 22, and are joined to the respective inner side surfaces 22b.

FIG. 10 is a drawing that shows a positioning structure of the left and right main frames 22 and the gusset 85.

The state drawing B shown on the upper side is a left side view that shows a state where the gusset 85 has been positioned with respect to the left and right main frames 22, and the state drawing C shown on the lower side is a right side view that shows the inner side surface 22b of the main frame 22.

As shown in the state drawing B, in connection portions 92 of the left and right main frames 22 and the left and right upper extension portions 85b of the gusset 85, a pair of left and right positioning portions 93 are arranged, the left and right positioning portions 93 positioning the left and right main frames 22 and the gusset 85.

With respect to the left and right protrusions 85k, the contour is formed into an elongated circle 85s, and a long axis 85t of the elongated circle 85s is formed along the die removal direction of the forging die for the gusset 85.

As shown in the state drawing C, in the inner side surface 22b of the main frame 22, an elongated hole 22h is formed, the elongated hole 22h having a long axis inclined at the same angle as that of the long axis 85t of the protrusion 85k.

The protrusion 85k and the elongated hole 22h described above configure the positioning portion 93.

The left and right protrusions 85k of the gusset 85 described above are fit into the elongated holes 22h of the left and right main frames 22, and the gusset 85 is positioned with respect to the left and right main frames 22. Thus, the gusset 85 can be joined to the left and right main frames 22 in a state where the gusset 85 has been positioned, and assembling accuracy and assembling workability of the gusset 85 can be improved.

Figure 11:
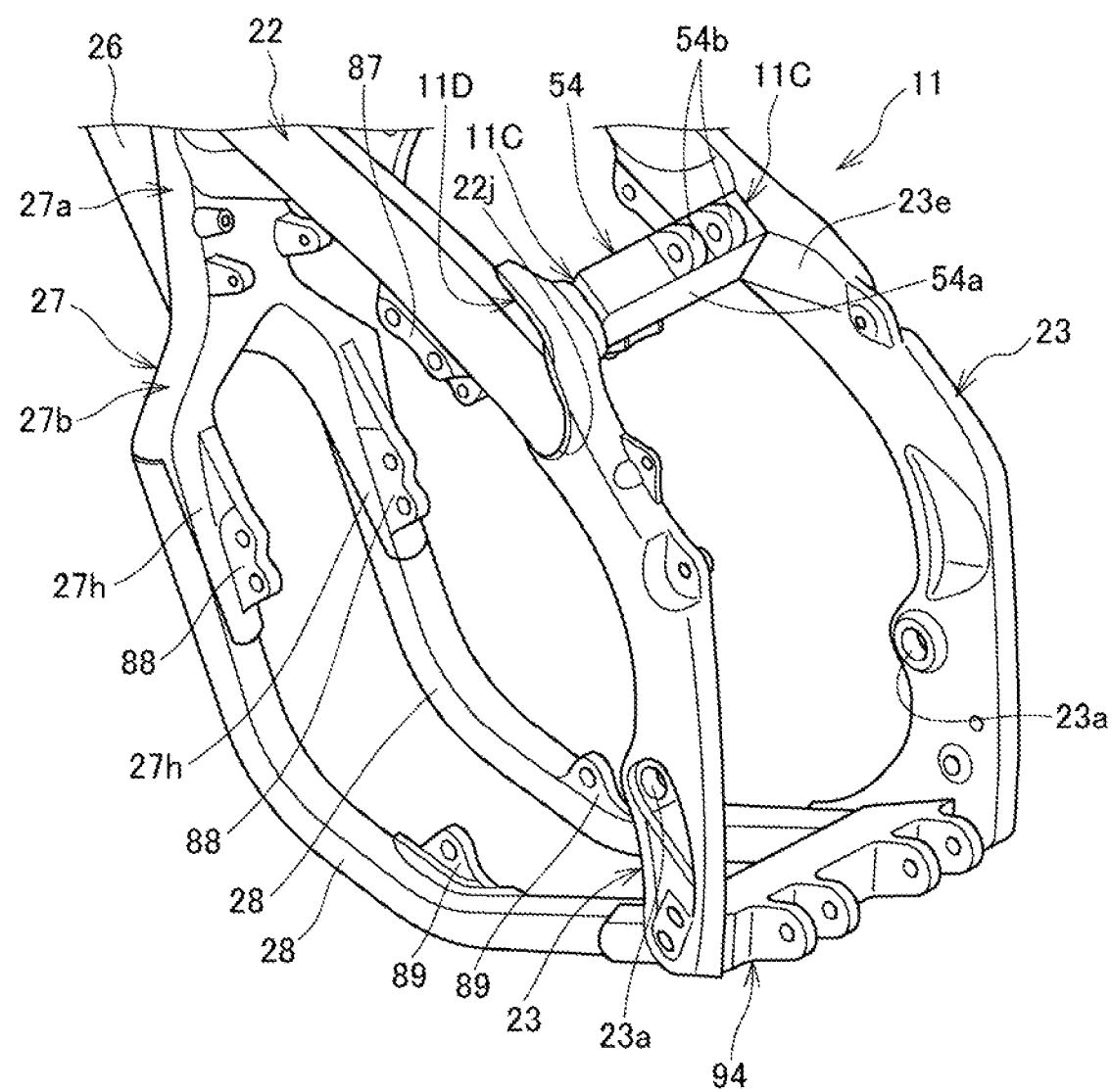
FIG. 11 is a perspective view that shows the lower portion of the body frame.

FIG. 11 is a perspective view that shows the lower portion of the body frame 11.

The lower joint portion 27b of the front joint 27 branches in the vehicle width direction to have a reversed Y-shape, and the left and right front engine hangers 88 are respectively arranged in an integral manner in the rear portions of the left and right lower frame connection portions 27h that extend in the vertical direction.

The body frame 11 includes the cushion upper bracket 54 and a link bracket 94, the cushion upper bracket 54 connecting the upper end portions of the left and right pivot frames 23 to each other, the link bracket 94 connecting the lower portions of the left and right pivot frames 23 to each other and supporting the link mechanism 83 (refer to FIG. 1).

On the outer side in the vehicle width direction of connection portions 11C of the upper end portions of the pivot frames 23 and the end portions of the cushion upper bracket 54, connection portions 11D are disposed (one connection portion 11D only is illustrated), the connection portions 11D connecting the upper end portions of the pivot frames 23 and the lower end portions of the main frames 22.

At the connection portions 11D, the main frames 22 are connected to the outer side of the pivot frames 23.

In the lower portions of the left and right pivot frames 23, pivot shaft insertion holes 23a are formed respectively, the pivot shaft 33 (refer to FIG. 1) being inserted into the pivot shaft insertion holes 23a.

Figure 12:
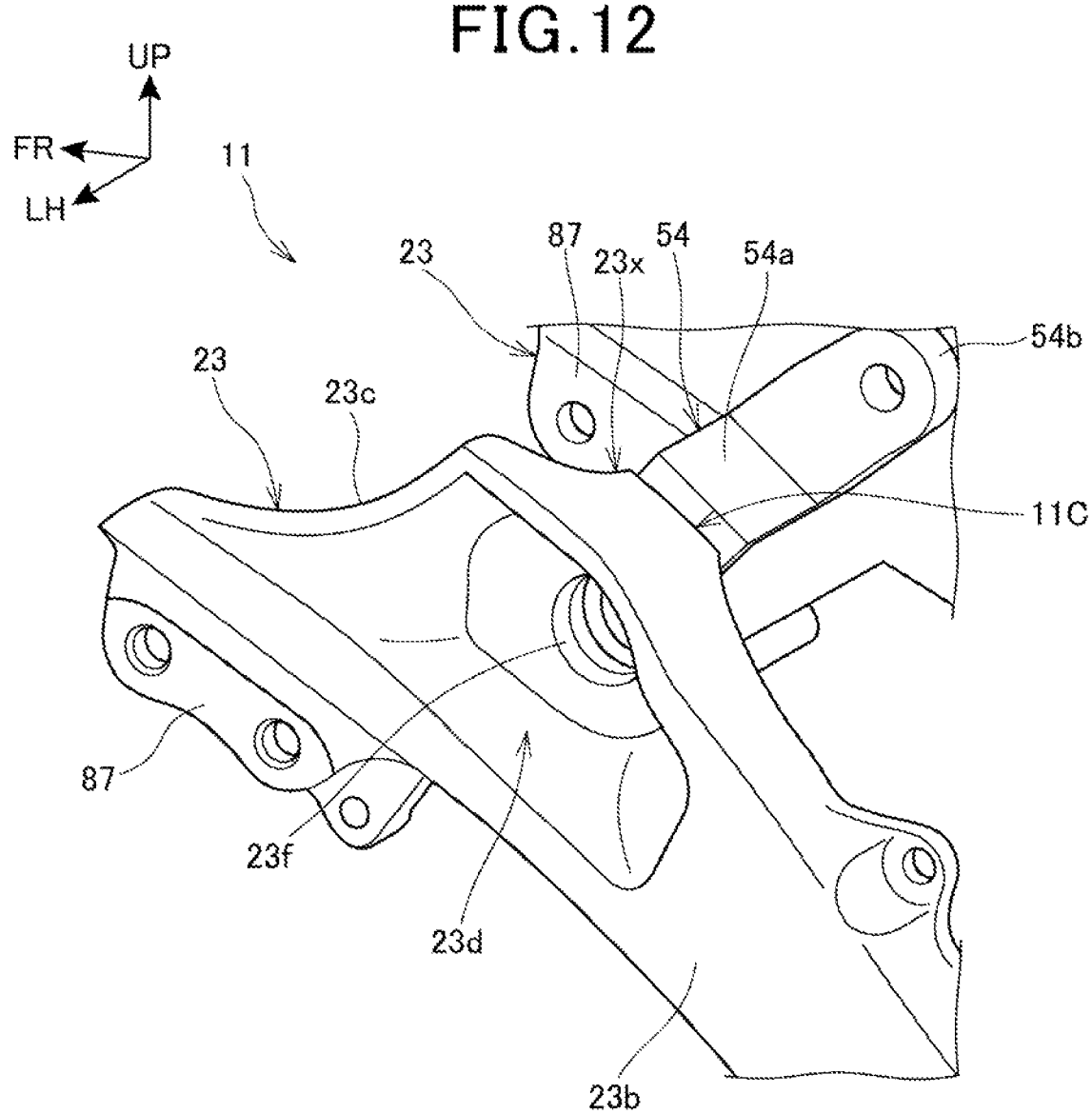
FIG. 12 is a perspective view that shows a connection portion of the pivot frame and a cushion upper bracket and the surroundings thereof.
Figure 13:
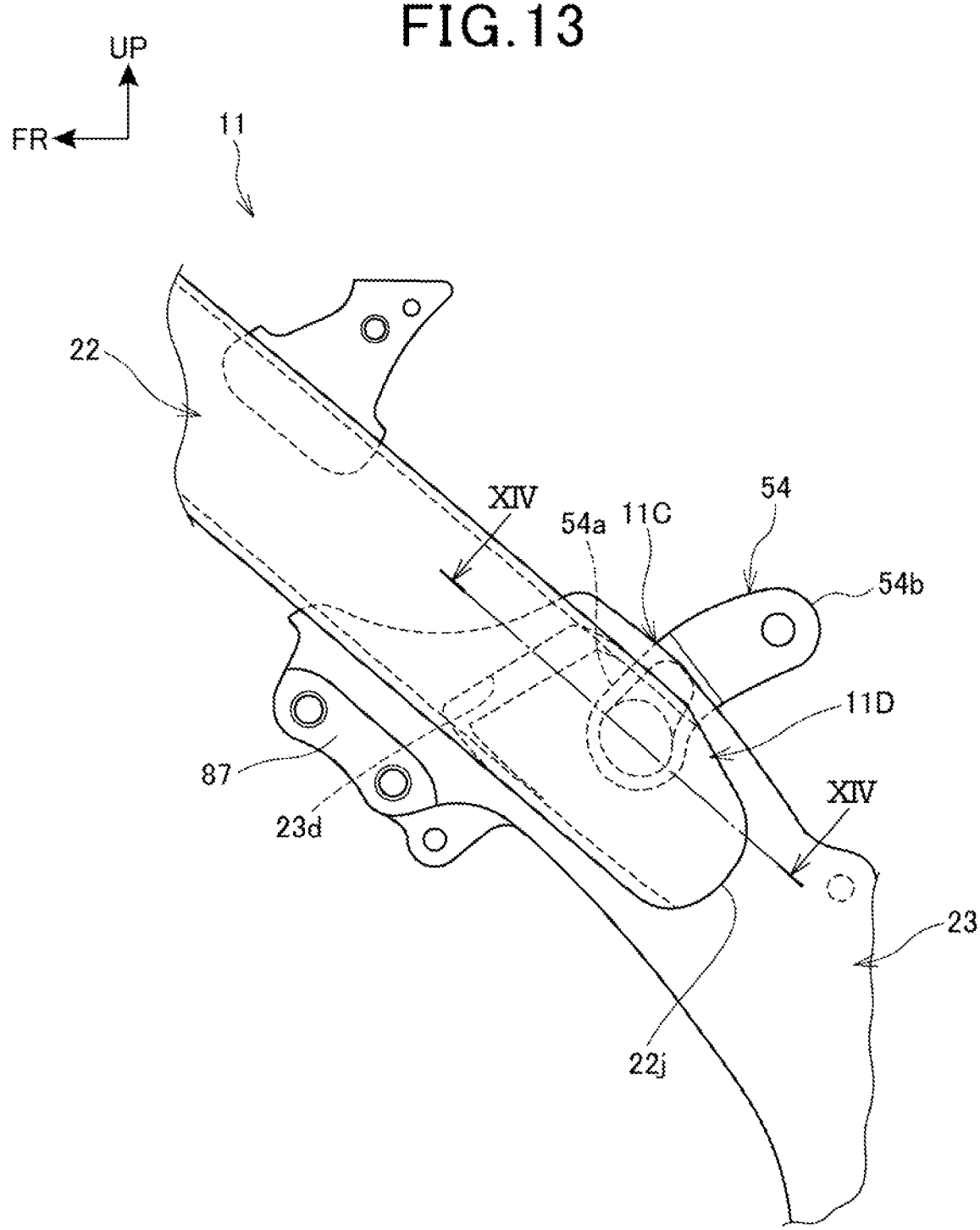
FIG. 13 is a left side view that shows connection portions in the upper end portion of the pivot frame.
Figure 14:
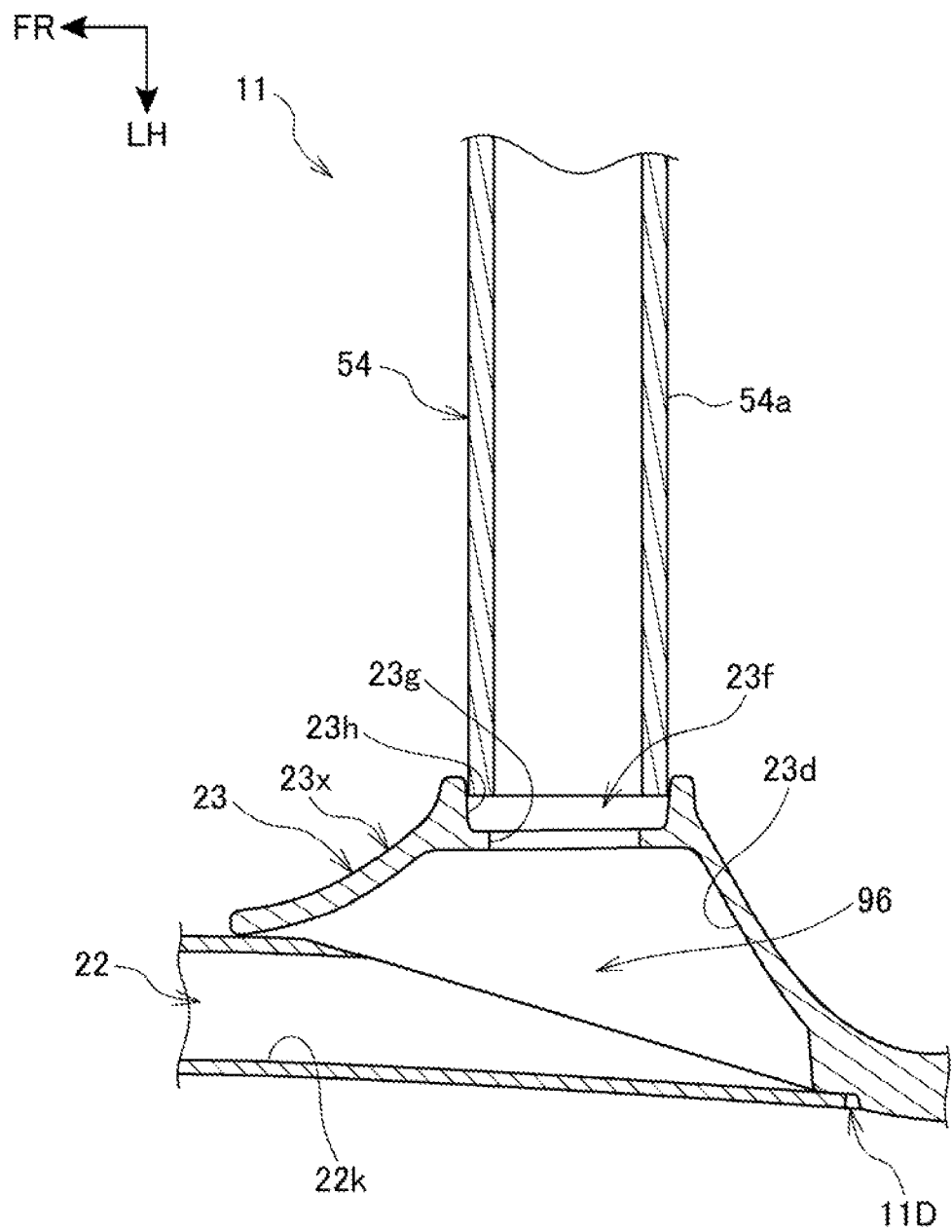
FIG. 14 is a cross-sectional view taken along the line XIV-XIV of FIG. 13.

FIG. 12 is a perspective view that shows the connection portion 11C of the pivot frame 23 and the cushion upper bracket 54 and its surroundings, FIG. 13 is a left side view that shows the connection portions 11C, 11D in the upper end portion of the pivot frame 23, and FIG. 14 is a cross-sectional view taken along the line XIV-XIV of FIG. 13.

As shown in FIG. 12, in the upper end portion of an outer side surface 23b of the pivot frame 23, an upper end portion recess 23d is formed, the upper end portion recess 23d extending to a front end surface 23c, and a penetration hole 23f is bored in the bottom portion of the upper end portion recess 23d, the penetration hole 23f penetrating to an inner side surface 23e (refer to FIG. 11) of the pivot frame 23.

As shown in FIG. 13, the main frames 22, the pivot frames 23, and the cushion upper bracket 54 overlap with each other in a vehicle side view. Also, the connection portion 11C and the connection portion 11D overlap with each other in a vehicle side view.

The main frame 22 is joined to the pivot frame 23 so as to cover the upper end portion recess 23d from the outer side in the vehicle width direction.

A rear end 22j of the main frame 22 extends to behind the bracket body 54a of the cushion upper bracket 54. Also, the rear end 22j of the main frame 22 extends to the rear side of the entire cushion upper bracket 54 including the cushion support arm portions 54b in the longitudinal direction of the main frame 22.

Since the rear end 22j of the main frame 22 is apart from the connection portion 11C of the cushion upper bracket 54 and the pivot frame 23 in such a manner, a portion distanced from the cushion upper bracket 54 can be arranged in the connection portion 11D of the pivot frame 23 and the main frame 22. Thus, the stress generated in the connection portion 11D can be suppressed by a load propagated from the cushion upper bracket 54.

As shown in FIG. 14, the left and right pivot frames 23 respectively include upper end protrusion portions 23x at the upper end portions, the upper end protrusion portions 23x protruding while gradually shrinking toward the inside in the vehicle width direction, and both ends of the cushion upper bracket 54 are connected to the front end portions of the left and right upper end protrusion portions 23x.

On the outer side in the vehicle width direction of the upper end protrusion portions 23x, the upper end portion recesses 23d having a large volume are provided, and thereby weight reduction is achieved while avoiding stress concentration.

The penetration hole 23f includes a small diameter hole 23g and a large diameter hole 23h, the small diameter hole 23g being adjacent to the upper end portion recess 23d, the large diameter hole 23h being adjacent to the small diameter hole 23g and having a diameter larger than that of the small diameter hole 23g.

To the large diameter hole 23h, the end portion of the bracket body 54a of the cushion upper bracket 54 is inserted and joined, the bracket body 54a having a tubular shape. By thus arranging the small diameter hole 23g and the large diameter hole 23h, the insertion position in inserting the bracket body 54a to the large diameter hole 23h can be restricted, the volume of the hollow portion inside the cushion upper bracket 54 can be further increased, and the weight of the pivot frame 23 can be reduced effectively.

Also, the rear end portion of the main frame 22 is cut obliquely, a hollow portion 22k of the main frame 22 and the upper end portion recess 23d of the pivot frame 23 are made to communicate with each other, and an integrated space 96 is formed. By forming such the space 96, the space 96 can be made larger compared to a case where the rear end portion of the main frame 22 is not made to be oblique and the rear end portion of the main frame 22 is simply joined to the pivot frame 23. As a result, a box shape can be formed by the main frame 22 and the pivot frame 23 while achieving weight reduction of the rear end portion of the main frame 22, and rigidity of the connection portion 11D can be enhanced.

Also, since the pivot frame 23 is disposed on the inner side in the vehicle width direction of the main frame 22 and the pivot frame 23 includes the upper end protrusion portion 23x at the connection portion with the cushion upper bracket 54, the interval between the left and right pivot frames 23 can be made small, and the cushion upper bracket 54 can be shortened. The upper end protrusion portion 23x of the pivot frame 23 is also lightened by the penetration hole 23f and the upper end portion recess 23d, and the weight of the cushion upper bracket 54 and the left and right pivot frames 23 can be thereby reduced.

Also, since the rear end portion of the main frame 22, the upper end portion of the pivot frame 23, and the cushion upper bracket 54 overlap with each other in the vehicle width direction, a load inputted from the cushion unit 55 (refer to FIG. 1) to the cushion upper bracket 54 can be propagated efficiently to the main frame 22.

As a result, the load described above can be shared by respective portions of the body frame 11, stress concentration in the body frame 11 can be suppressed, more uniform deflection of the body frame 11 can be secured, and therefore strength and steering stability can be improved.

Figure 15:
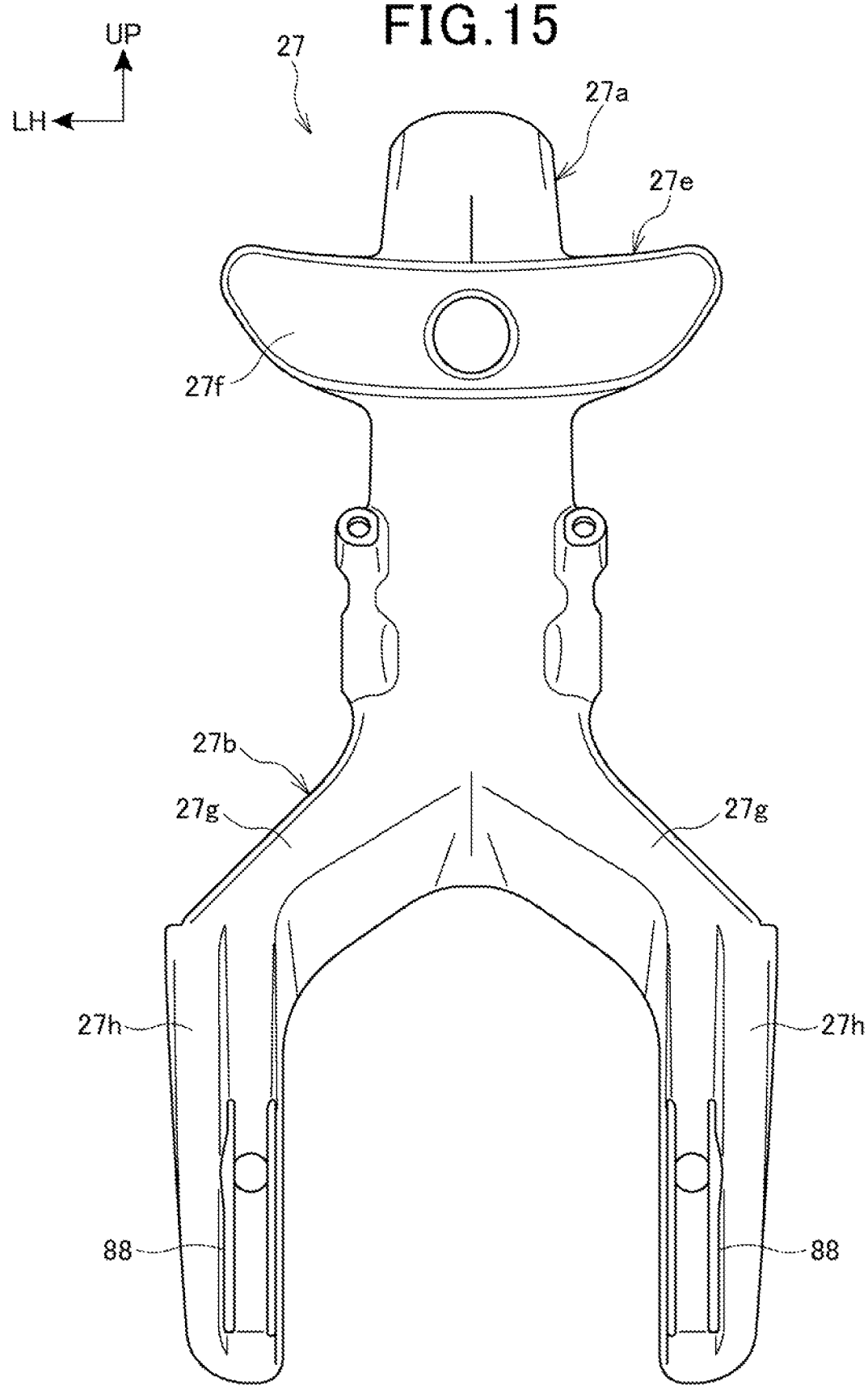
FIG. 15 is a rear view that shows a front joint.

FIG. 15 is a rear view that shows the front joint 27.

The rearward protrusion portion 27e of the front joint 27 is formed to be widest in terms of the width in the vehicle width direction of the upper joint portion 27a. By thus allowing the rearward protrusion portion 27e to have a wide width in the vehicle width direction, the reinforcement pipe 34 can be supported solidly, the reinforcement pipe 34 being joined to the recessed shape curved portion 27f of the rearward protrusion portion 27e (refer to FIG. 4).

Also, by arranging the left and right hollow portions 27g that are branched portions of the upper portion of the lower joint portion 27b, the weight can be reduced by the hollow portions 27g immediately after branching from the upper joint portion 27a, rigidity of the entire front joint 27 can be adjusted, and steering stability can be improved.

Further, by arranging the front engine hangers 88 in the lower frame connection portions 27h, the front portion of the engine 35 (refer to FIG. 1) can be supported by the lower frame connection portions 27h whose rigidity is improved by being overlapped in the vehicle longitudinal direction on the lower frame 28 (refer to FIG. 11), and supporting rigidity of the engine 35 can be improved.

Figure 16:
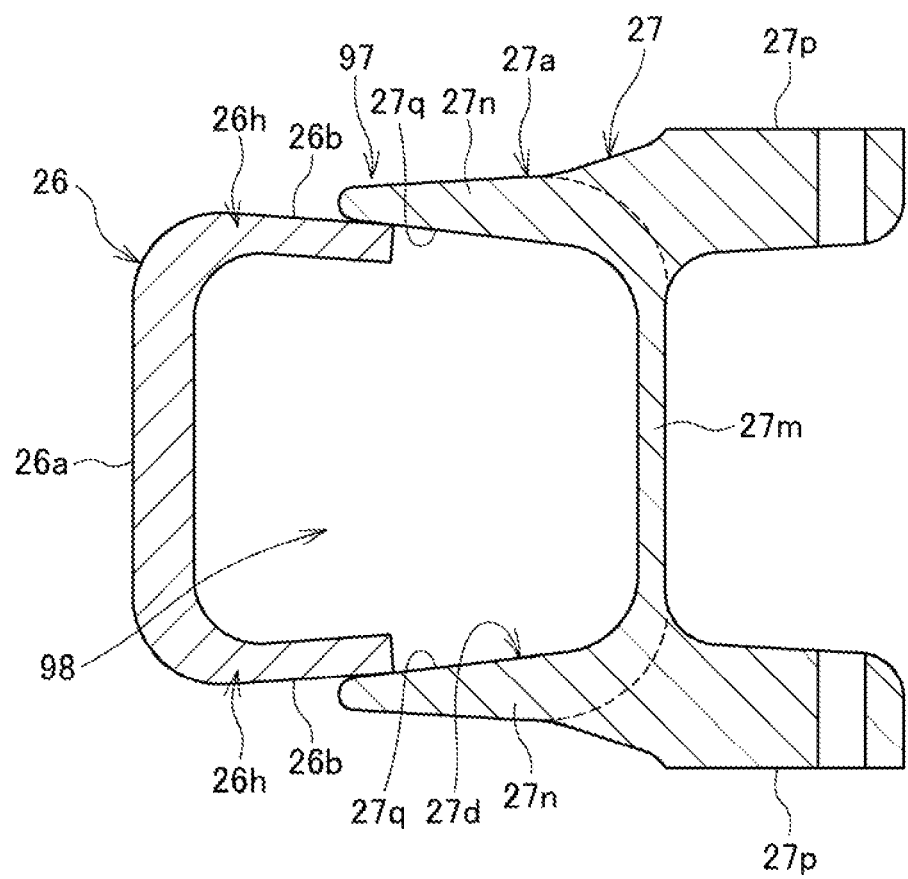
FIG. 16 is a cross-sectional view taken along the line XVI-XVI of FIG. 4.

FIG. 16 is a cross-sectional view taken along the line XVI-XVI of FIG. 4, and shows a connection portion 97 of the down frame 26 and the front joint 27.

The outer side surfaces 26b of the left and right side wall portions 26h of the down frame 26 incline with respect to the vehicle longitudinal direction so as to gradually approach each other as going rearward.

The recessed portion 27d of the upper joint portion 27a of the front joint 27 is formed of a bottom wall 27m and a pair of left and right side walls 27n in an integral manner, the side walls 27n extending forward and obliquely outward from both side edges of the bottom wall 27m. At the corner portions of the bottom wall 27m and the left and right side walls 27n, a pair of left and right component attaching portions 27p extending rearward are arranged.

Respective inner side surfaces 27q of the left and right side walls 27n extend along the left and right outer side surfaces 26b of the down frame 26, and are joined to the rear end portions of the respective outer side surfaces 26b.

Each of the lower portion of the down frame 26 and the upper joint portion 27a of the front joint 27 has a U-shaped cross-sectional shape, and the width in the vehicle width direction of the cross section of the down frame 26 becomes narrower as it goes rearward. Thus, the down frame 26 is easily assembled to the recessed portion 27d of the upper joint portion 27a, and the lower portion of the down frame 26 and the upper joint portion 27a of the front joint 27 can be joined to each other precisely. Also, a box-like space 98 can be formed by the down frame 26 and the upper joint portion 27a, and rigidity of the body frame 11 can be improved.

Figure 17:
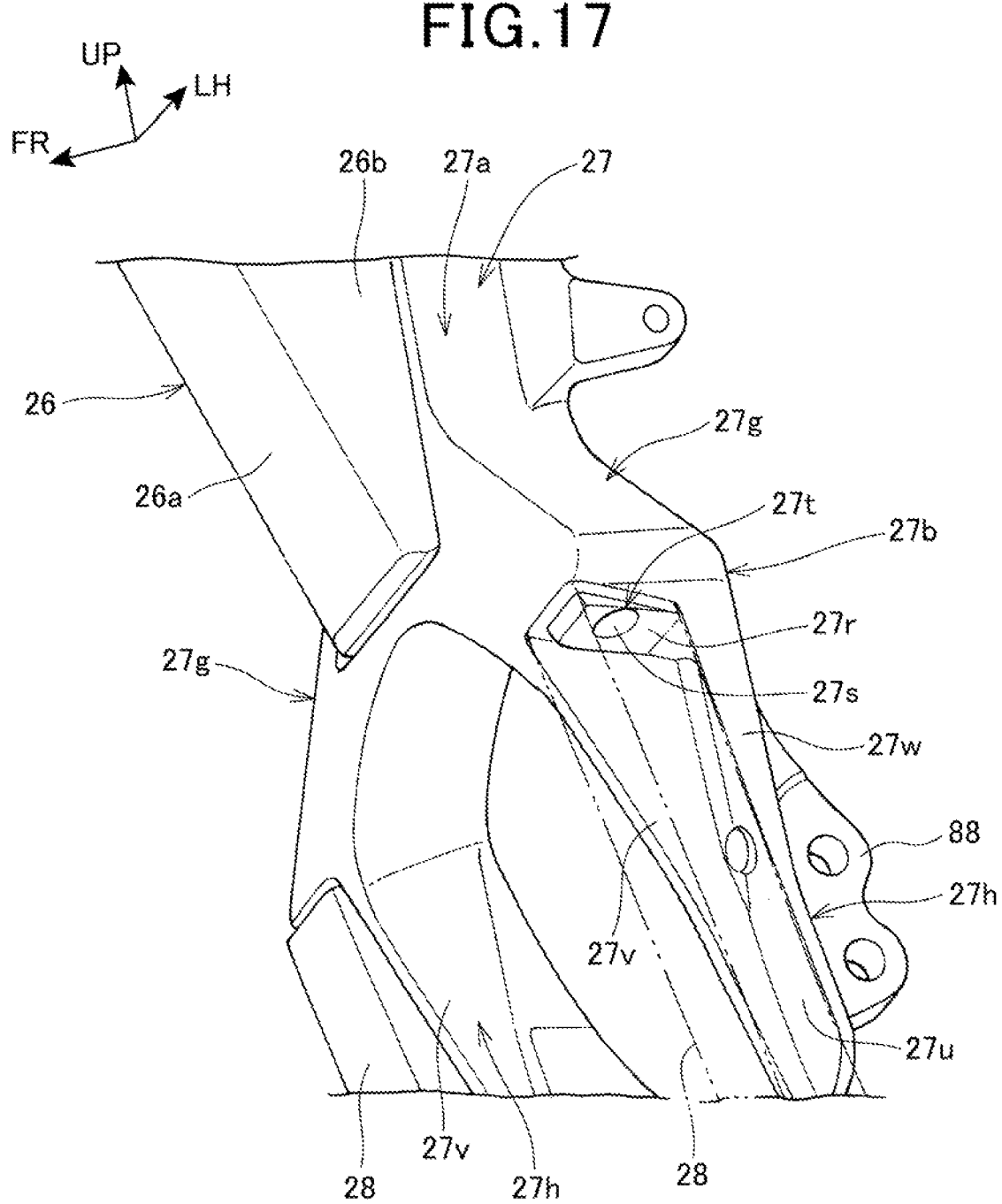
FIG. 17 is a perspective view that shows the front joint and the surroundings thereof.

FIG. 17 is a perspective view that shows the front joint 27 and its surroundings.

The left and right hollow portions 27g of the front joint 27 respectively include a lower end surface 27r. In each of the left and right hollow portions 27g, a hole portion 27s for weight reduction is bored, the hole portion 27s extending along the longitudinal direction of the hollow portion 27g from the lower end surface 27r.

Respective openings 27t of the left and right hole portions 27s are covered by the left and right lower frames 28 that are joined to the left and right lower frame connection portions 27h of the front joint 27. Thus, stones and soil can be prevented from entering the hole portions 27s.

The left and right lower frame connection portions 27h include rear walls 27u, inner walls 27v, and outer walls 27w in an integral manner. The rear walls 27u, the inner walls 27v, and the outer walls 27w respectively extend downward from the hollow portions 27g in an integral manner. The upper end of each of the rear wall 27u, the inner wall 27v, and the outer wall 27w is connected to the rear edge, the inner edge, and the outer edge of the lower end surface 27r of the hollow portion 27g in an integral manner.

The front engine hanger 88 is arranged in the rear wall 27u, and respective side walls of the left and right lower frames 28 are joined to the inner walls 27v and the outer walls 27w.

Figure 18:
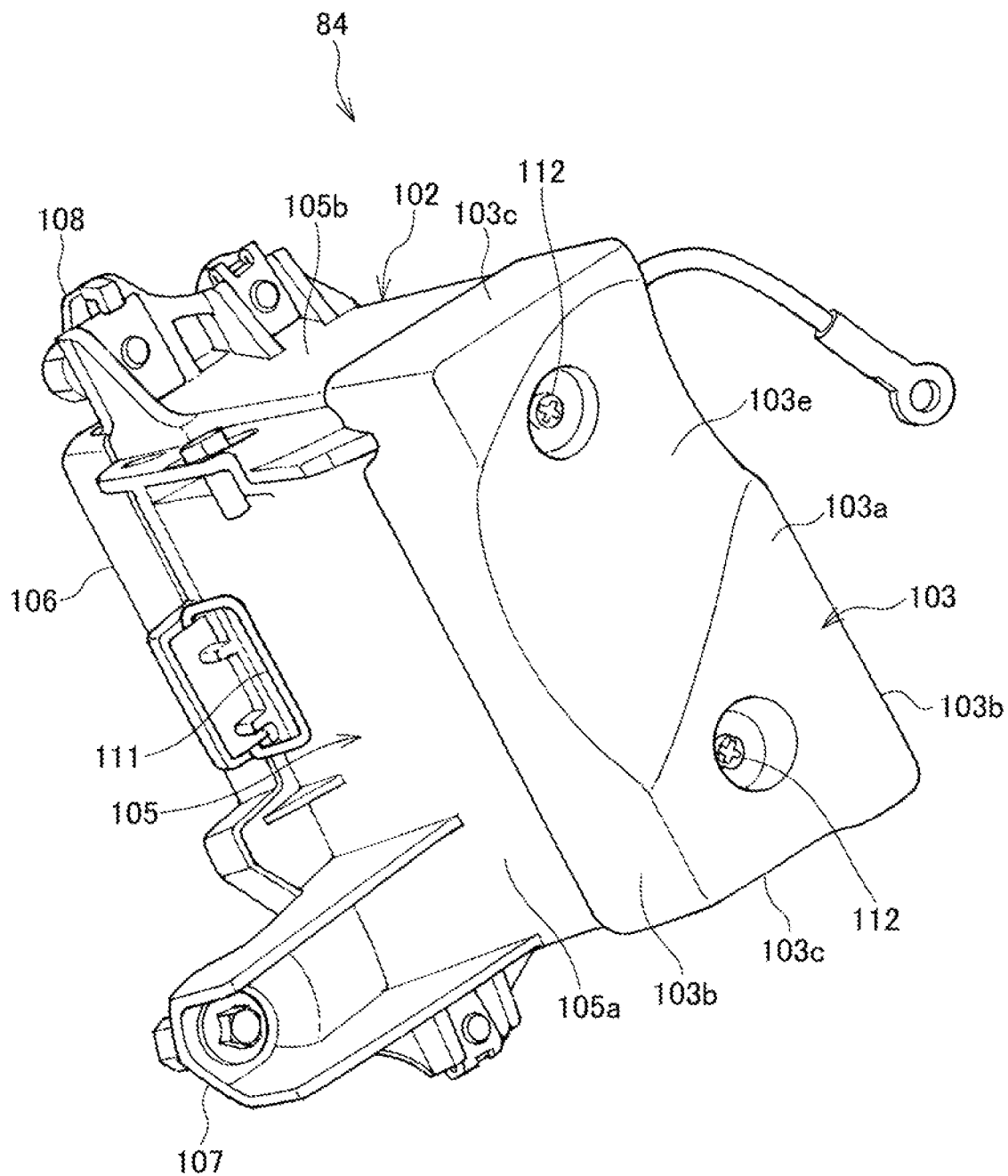
FIG. 18 is a perspective view that shows a battery device.

FIG. 18 is a perspective view that shows the battery device 84.

The battery device 84 is configured of the battery 101 (refer to FIG. 19), a battery case 102, and a heat shielding cover 103, the battery case 102 storing the battery 101, the heat shielding cover 103 protecting the battery 101 against heat generated by the exhaust pipe 51 (refer to FIG. 1).

The battery case 102 includes a battery case body 105 and a battery case cover 106, the battery case cover 106 blocking the opening portion of the battery case body 105.

The battery case body 105 includes a plurality of frame fixing portions 107, 108 that are for fixing the battery device 84 to the pivot frames 23.

The plurality of frame fixing portions 107, 108 are respectively arranged on side walls 105a, 105b of the battery case body 105. Here, the side walls 105a, 105b configure a part of four side walls that form a quadrangular shape. Also, the number of pieces of the side walls of the battery case body 105 is not necessarily limited to four pieces.

The battery case cover 106 includes a pair of locking members 111 that are for locking the battery case cover 106 to the battery case body 105.

The heat shielding cover 103 is fixed to a surface on the opposite side of the battery case cover 106 of the battery case body 105 by a plurality of screws 112.

Figure 19:
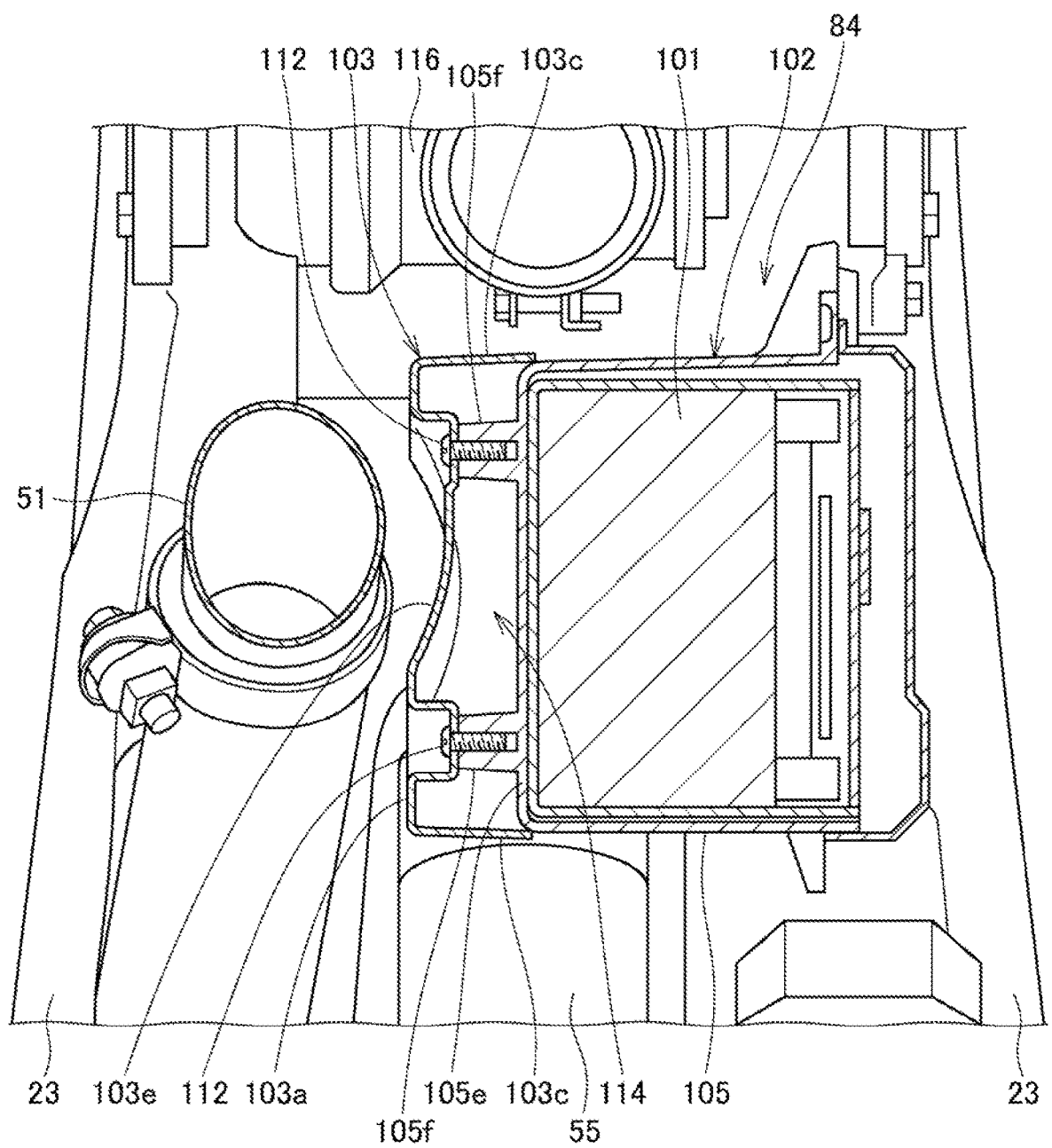
FIG. 19 is a cross-sectional view taken along the line XIX-XIX of FIG. 1.

FIG. 19 is a cross-sectional view taken along the line XIX-XIX of FIG. 1.

The battery device 84 is cantilevered to the pivot frame 23 of one side (the left side) through the frame fixing portions 107, 108 (refer to FIG. 18). The battery device 84 is cantilevered thus to a part of the body frame 11, and thereby the degree of freedom of layout of the battery device 84 to the body frame 11 can be increased.

A pair of boss portions 105f are formed in a bottom wall 105e of the battery case body 105, the boss portions 105f protruding sideways, and the heat shielding cover 103 is fixed to the bottom wall 105e by the screws 112 that penetrate the heat shielding cover 103 and are respectively screwed to a pair of the boss portions 105f.

The heat shielding cover 103 is formed into a box shape including a bottom wall 103a and a plurality of side walls 103b (refer to FIG. 18), 103c, and a space 114 is formed by the heat shielding cover 103 and the bottom wall 105e of the battery case body 105, the space 114 being tightly enclosed or generally tightly enclosed.

The bottom wall 103a of the heat shielding cover 103 is disposed to be apart in the vehicle width direction from the exhaust pipe 51. A curved recessed portion 103e is formed in the bottom wall 103a, the curved recessed portion 103e being curvingly recessed, and the curved recessed portion 103e is formed so as to surround a part of the outer circumferential surface of the exhaust pipe 51.

A throttle body 116 is disposed above the battery device 84, the throttle body 116 configuring the intake device, and the cushion unit 55 is disposed behind the battery device 84.

By forming the space 114 on the opposite side of the exhaust pipe 51 of the heat shielding cover 103 as described above, compared to a case of simply covering the battery case 102, heat can be blocked through an air layer inside the space 114, and the heat shielding effect can be enhanced.

As shown in FIG. 1, FIG. 3 and FIG. 9 above, with respect to the body frame 11 of the motorcycle 10 as a saddle riding vehicle, a pair of the left and right main frames 22 extend downward to the rear from the upper portion of the head pipe 21, and the down frame 26 extends downward to the rear below the left and right main frames 22 from the lower portion of the head pipe 21.

In the body frame 11, the gusset 85 is arranged, the gusset 85 being as a reinforcement member joined to the head pipe 21, and the gusset 85 includes the center wall portion 85a and the lower extension portions 85c, the center wall portion 85a being as a vertical wall portion disposed between the inner side wall portions 22x of the left and right main frames 22, the lower extension portions 85c extending downward from the center wall portion 85a and being joined to the outer side surfaces 26b of the down frame 26.

According to this configuration, by joining the lower extension portions 85c to the outer side surfaces 26b of the down frame 26, a load applied from the head pipe 21 to the down frame 26 can be received by the lower extension portions 85c, stress concentration in the rear surface 26c of the down frame 26 can be suppressed, and strength of the body frame 11 can be secured.

Also, as shown in FIG. 8, the down frame 26 is formed into a trapezoidal shape in cross section including the front wall portion 26g, the rear wall portion 26f, and a pair of the left and right side wall portions 26h, the rear wall portion 26f facing the rear of the front wall portion 26g, the side wall portions 26h connecting both ends of each of the front wall portion 26g and the rear wall portion 26f to each other. The rear wall portion 26f corresponding to the upper side of the trapezoidal shape is narrower in width in the vehicle width direction compared to the front wall portion 26g corresponding to the lower side of the trapezoidal shape, and the lower extension portions 85c of the gusset 85 are joined to the outer side surfaces 26b of the left and right side wall portions 26h.

According to this configuration, by making the cross section of the down frame 26 to have the trapezoidal shape, the mating surface with the down frame 26 becomes excellent without machining work of the gusset 85. Also, it is possible to reduce the cross-sectional area of the down frame 26 and to allow the entire body frame 11 to have a constant rigidity without being excessively enhanced, and ride comfort and steering stability can be improved.

Also, as shown in FIG. 5 and FIG. 6, the gusset 85 is a forged product.

According to this configuration, the gusset 85 connected to the head pipe 21, the left and right main frames 22, and the down frame 26 can be formed integrally, and can be made to be thin and compact since the gusset 85 is made a forged product. Also, since the cross section of the down frame 26 has a trapezoidal shape, the mating surface with the down frame 26 becomes excellent without machining work of the gusset 85.

Also, as shown in FIG. 4 and FIG. 8, the lower extension portions 85c of the gusset 85 are arranged so as to gradually become narrower in width as going downward along the left and right side wall portions 26h of the down frame 26, and the rear edge 85e of the lower extension portion 85c inclines with respect to the longitudinal direction of the down frame 26.

According to this configuration, since the down frame 26 and the gusset 85 cross obliquely, stress is relaxed, and strength improves.

Also, as shown in FIG. 5 and FIG. 10, the positioning portion 93 is arranged in the connection portion 92 as the mating portion of the main frames 22 and the gusset 85, the positioning portion 93 positioning the main frames 22 and the gusset 85.

According to this configuration, positioning of the main frames 22 and the gusset 85 becomes easy, and assembling performance can be improved.

Also, as shown in FIG. 3 and FIG. 9, the gusset 85 includes a pair of the left and right upper extension portions 85b that extend rearward along the inner side wall portions 22x of each of the main frames 22 from the left and right ends of the center wall portion 85a and are joined to the inner side wall portions 22x.

According to this configuration, the connection portion 11A (refer to FIG. 4) of the head pipe 21 and the left and right main frames 22 can be reinforced.

Also, as shown in FIG. 3, FIG. 4, and FIG. 7, the head pipe 21 includes the upper extension portion 21a and the lower extension portion 21c, the upper extension portion 21a extending along the inner side wall portions 22x from the upper wall portions 22w of the main frames 22, the lower extension portion 21c extending along the side wall portions 26h of the down frame 26, the upper extension portion 21a is joined to the center wall portion 85a of the gusset 85, and the lower extension portion 21c is joined to the side wall portions 26h of the down frame 26.

According to this configuration, the joint strength of the head pipe 21 and the down frame 26 and the gusset 85 can be increased.

Also, as shown in FIG. 2, FIG. 4, FIG. 8, and FIG. 16, the pivot frames 23 extending downward respectively are connected to the rear end portions of the left and right main frames 22, a pair of the left and right lower frames 28 are connected to the lower end portion of the down frame 26 through the front joint 27, the rear end portions of the left and right lower frames 28 are respectively connected to the pivot frames 23, and the side walls 27n as the connection portions of the front joint 27 to the down frame 26 are widened toward the front and are connected to the rear wall portion 26f and the left and right side wall portions 26h of the down frame 26.

According to this configuration, with respect to the front joint 27 also, the trapezoidal shape in cross section of the down frame 26 allows the mating surface with the front joint 27 to be excellent similarly to the mating surface with the gusset 85.

Also, as shown in FIG. 1 and FIG. 11 to FIG. 13, respective upper end portions of the left and right pivot frames 23 are connected to each other by the cushion upper bracket 54, one end portion of the cushion unit 55 being connected to the cushion upper bracket 54, the cushion unit 55 relaxing impact propagated from the rear wheel 16, and the rear ends 22j of the main frames 22 are positioned behind the connection portions 11C of the cushion upper bracket 54 to the pivot frames 23 in a side view, the rear ends 22j of the main frames 22 being connected to respective upper end portions of the left and right pivot frames 23.

According to this configuration, by allowing the connection portions 11D of the main frames 22 and the pivot frames 23 to escape from the connection portion 11C of the cushion upper bracket 54 to which a load is applied from the cushion unit 55, the stress applied to the connection portions 11D can be suppressed, the strength of the body frame 11 can be secured, and the load described above can be supported efficiently by the main frames 22. Further, a lightening portion can be formed in the portions where the main frames 22 and the pivot frames 23 overlap, and weight reduction can be achieved.

The embodiment described above shows only one aspect of the present invention, and modifications and applications are optionally possible within a scope not departing from the gist of the present invention.

The present invention is not limited to a case of being applied to the motorcycle 10, and can be also applied to saddle riding vehicles besides the motorcycle 10.

REFERENCE SIGNS LIST

10 . . . Motorcycle (saddle riding vehicle)
11 . . . Body frame
11C . . . Connection portion of pivot frame and cushion upper bracket
16 . . . Rear wheel
21 . . . Head pipe
21a . . . Upper extension portion
21c . . . Lower extension portion
22 . . . Main frame
22j . . . Rear end
22w . . . Upper wall portion
22x . . . Inner side wall portion
23 . . . Pivot frame 26 . . . Down frame
26b . . . Outer side surface
26f . . . Rear wall portion
26g . . . Front wall portion
26h . . . Side wall portion
27 . . . Front joint
27n . . . Side wall (connection portion)
28 . . . Lower frame
54 . . . Cushion upper bracket
55 . . . Cushion unit
85 . . . Gusset (reinforcement member)
85a . . . Center wall portion (vertical wall portion)
85b . . . Upper extension portion
85c . . . Lower extension portion
85e . . . Rear edge
92 . . . Connection portion (mating portion) of main frame and left and right extension portions of gusset
93 . . . Positioning portion
97 . . . Connection portion of down frame and front joint

The invention claimed is:

1. A body frame of a saddle riding vehicle in which a pair of left and right main frames extend downward to the rear from an upper portion of a head pipe and a down frame extends downward to the rear from a lower portion of the head pipe, wherein
   a reinforcement member joined to the head pipe is arranged,
   the reinforcement member includes a vertical wall portion and lower extension portions, the vertical wall portion being disposed between inner side wall portions of the left and right main frames, the lower extension portions extending downward from the vertical wall portion and being joined to side surfaces of the down frame,
   the down frame is formed into a trapezoidal shape in cross section including a front wall portion, a rear wall portion, and a pair of left and right side wall portions, the rear wall portion facing the rear of the front wall portion, the side wall portions connecting both ends of each of the front wall portion and the rear wall portion to each other,
   the rear wall portion corresponding to an upper side of the trapezoidal shape is narrower in width in a vehicle width direction compared to the front wall portion corresponding to a lower side of the trapezoidal shape,
   the lower extension portions of the reinforcement member are joined to the side surfaces of the left and right side wall portions,
   the head pipe includes an upper extension portion and a lower extension portion, the upper extension portion extending along the inner side wall portions from upper wall portions of the main frames, the lower extension portion extending along the side wall portions of the down frame,
   the upper extension portion is joined to the vertical wall portion of the reinforcement member, and
   the lower extension portion is joined to the side wall portions of the down frame.

2. The body frame of the saddle riding vehicle according to claim 1, wherein
   the reinforcement member is a forged product.

3. The body frame of the saddle riding vehicle according to claim 1, wherein
   the lower extension portions of the reinforcement member are arranged so as to gradually become narrower in width as going downward along the left and right side wall portions of the down frame, and
   a rear edge of the lower extension portion inclines with respect to a longitudinal direction of the down frame.

4. The body frame of the saddle riding vehicle according to claim 1, wherein
   a positioning portion is arranged in a mating portion of the main frame and the reinforcement member, the positioning portion positioning the main frame and the reinforcement member.

5. The body frame of the saddle riding vehicle according to claim 1, wherein
   the reinforcement member includes a pair of left and right upper extension portions that extend rearward along the inner side wall portions of each of the main frames from left and right ends of the vertical wall portion and are joined to the inner side wall portions.

6. The body frame of the saddle riding vehicle according to claim 1, wherein
   pivot frames extending downward respectively are connected to rear end portions of the left and right main frames,
   a pair of left and right lower frames are connected to a lower end portion of the down frame through a front joint,
   rear end portions of the left and right lower frames are respectively connected to the pivot frames, and
   connection portions of the front joint to the down frame are widened toward the front and are connected to the rear wall portion and the left and right side wall portions of the down frame.

7. The body frame of the saddle riding vehicle according to claim 6, wherein
   respective upper end portions of the left and right pivot frames are connected to each other by a cushion upper bracket, one end portion of a cushion unit being connected to the cushion upper bracket, the cushion unit relaxing impact propagated from a rear wheel, and
   rear ends of the main frames are positioned behind connection portions of the cushion upper bracket to the pivot frames in a side view, the rear ends of the main frames being connected to the respective upper end portions of the left and right pivot frames.

* * * * *